United States Patent
Grube et al.

(10) Patent No.: US 8,683,259 B2
(45) Date of Patent: Mar. 25, 2014

(54) ACCESSING DATA IN MULTIPLE DISPERSED STORAGE NETWORKS

(75) Inventors: Gary W. Grube, Barrington Hills, IL (US); Timothy W. Markison, Mesa, AZ (US)

(73) Assignee: Cleversafe, Inc., Chicago, IL (US)

( * ) Notice: Subject to any disclaimer, the term of this patent is extended or adjusted under 35 U.S.C. 154(b) by 351 days.

(21) Appl. No.: 13/105,103

(22) Filed: May 11, 2011

(65) Prior Publication Data

US 2011/0289378 A1   Nov. 24, 2011

Related U.S. Application Data

(60) Provisional application No. 61/346,203, filed on May 19, 2010.

(51) Int. Cl.
*G06F 11/00* (2006.01)

(52) U.S. Cl.
USPC .......................... 714/6.22; 711/167

(58) Field of Classification Search
USPC .......................... 714/6.22; 711/167
See application file for complete search history.

(56) References Cited

U.S. PATENT DOCUMENTS

| | | | |
|---|---|---|---|
| 4,092,732 A | 5/1978 | Ouchi | |
| 5,454,101 A | 9/1995 | Mackay et al. | |
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Yolanda L Wilson
(74) *Attorney, Agent, or Firm* — Garlick & Markison; Timothy W. Markison

(57) ABSTRACT

A method begins by a processing module identifying sets of dispersed storage (DS) units for each of a plurality of dispersed storage networks (DSNs) in a computing system network, wherein a set of the sets of DS unit stores an error coded data file. The method continues with the processing module identifying a reference entity within the computing system network. The method continues with the processing module determining first data access performance information between the reference entity and a first one of the sets of DS units and determining second data access performance information between the reference entity and a second one of the sets of DS units for each of the plurality of DSNs. The method continues with the processing module storing the first and second data access performance information for each of the plurality of DSNs to produce system data access performance information.

10 Claims, 20 Drawing Sheets

(56) References Cited

U.S. PATENT DOCUMENTS

| | | | |
|---|---|---|---|
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,598,174 | B1* | 7/2003 | Parks et al. ............... 714/6.22 |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 2002/0062422 | A1 | 5/2002 | Butterworth et al. |
| 2002/0166079 | A1 | 11/2002 | Ulrich et al. |
| 2002/0199060 | A1* | 12/2002 | Peters et al. ............... 711/114 |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0112301 | A1* | 5/2006 | Wong ............................. 714/6 |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1* | 7/2007 | Gladwin et al. ............... 705/40 |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2008/0140973 | A1* | 6/2008 | Holt ............................. 711/167 |
| 2009/0094251 | A1 | 4/2009 | Gladwin et al. |
| 2009/0094318 | A1* | 4/2009 | Gladwin et al. ............... 709/203 |
| 2010/0023524 | A1 | 1/2010 | Gladwin et al. |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, Ti: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

\* cited by examiner

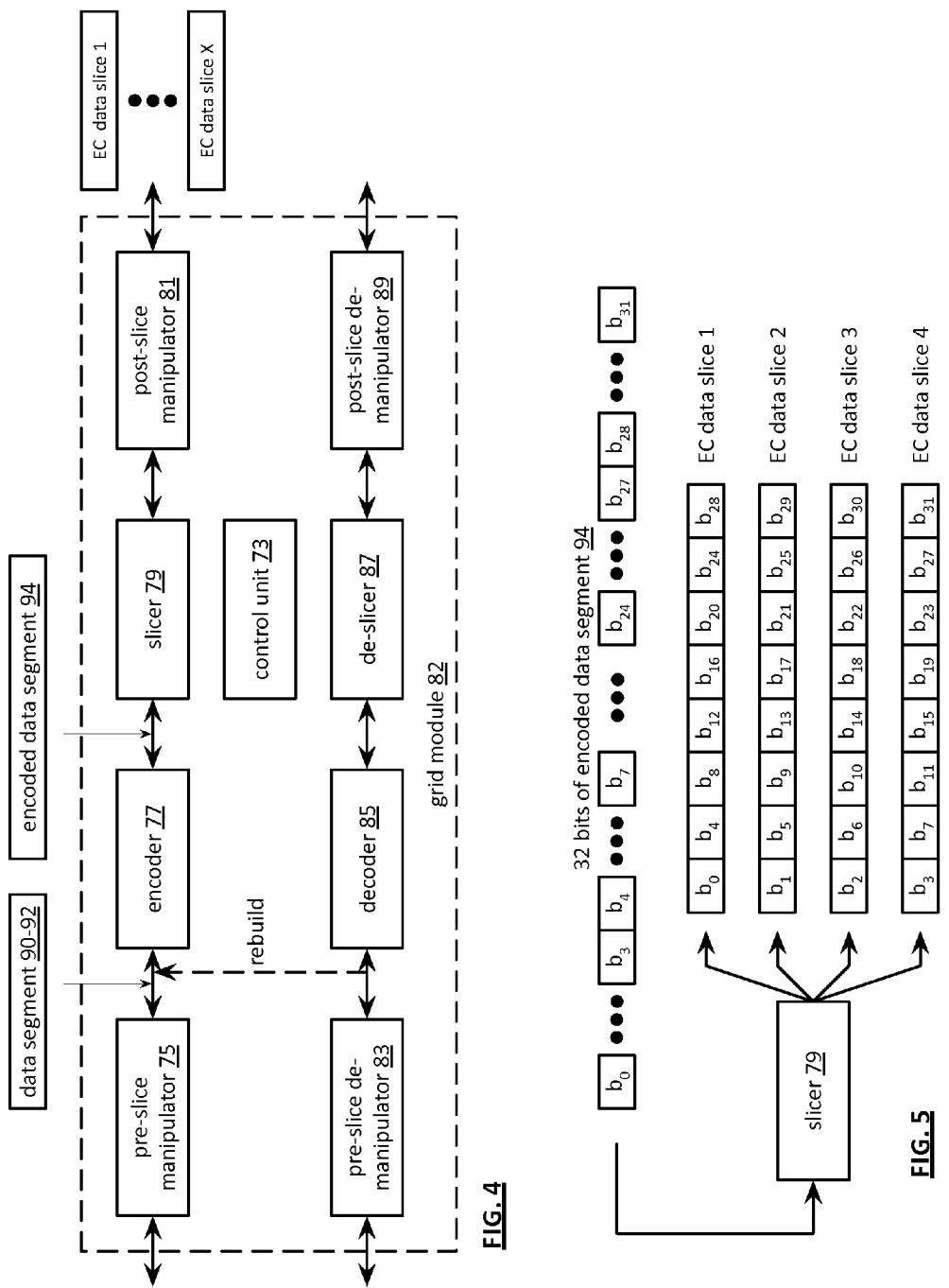

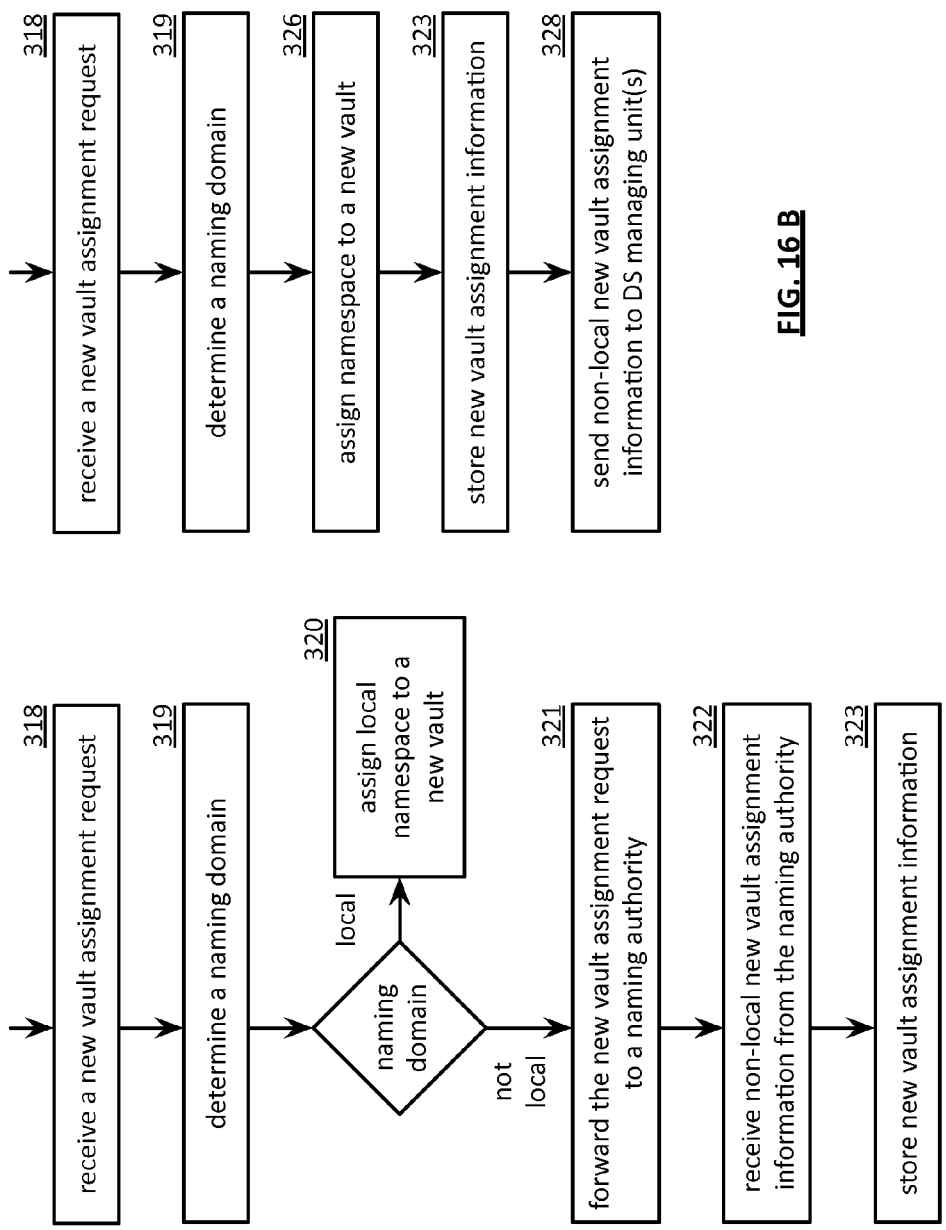

ACCESSING DATA IN MULTIPLE DISPERSED STORAGE NETWORKS

CROSS REFERENCE TO RELATED PATENTS

This patent application is claiming priority under 35 USC §119 to a provisionally filed patent application entitled INTER-DISPERSED STORAGE NETWORK COMMUNICATIONS having a provisional filing date of May 19, 2010, and a provisional Ser. No. 61/346,203, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failures issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 4 is a schematic block diagram of an embodiment of a grid module in accordance with the invention;

FIG. 5 is a diagram of an example embodiment of error coded data slice creation in accordance with the invention;

Figure 8:
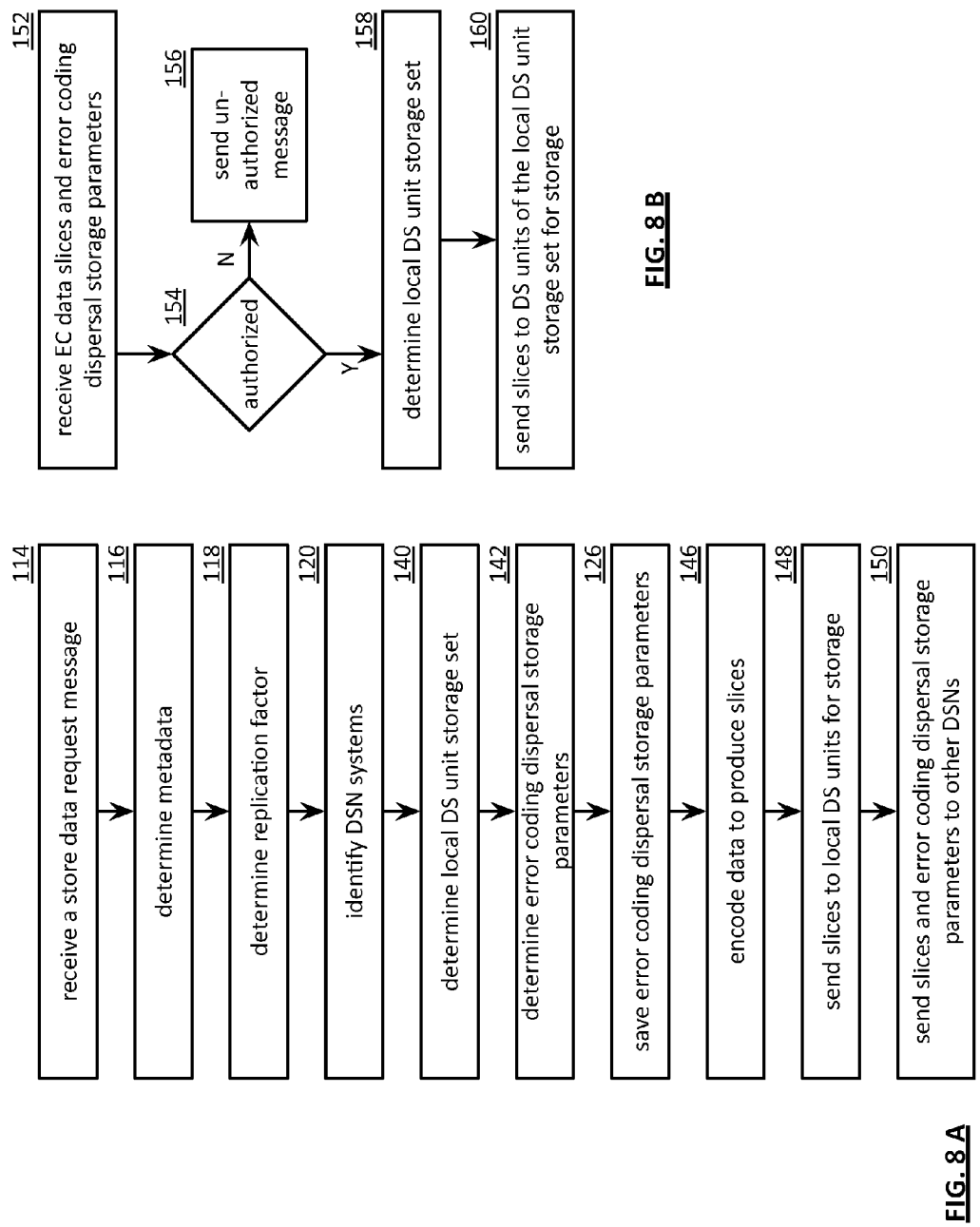
Figure 9:
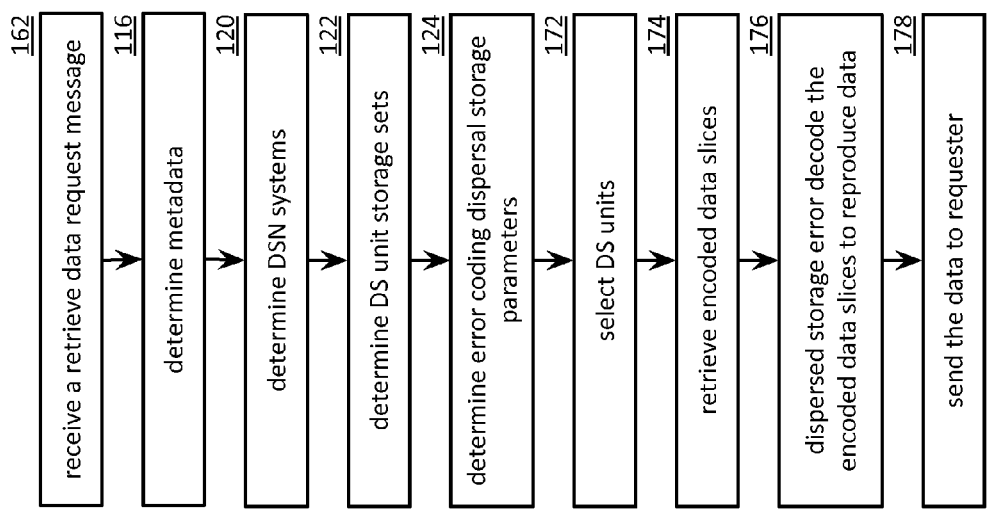
Figure 10:
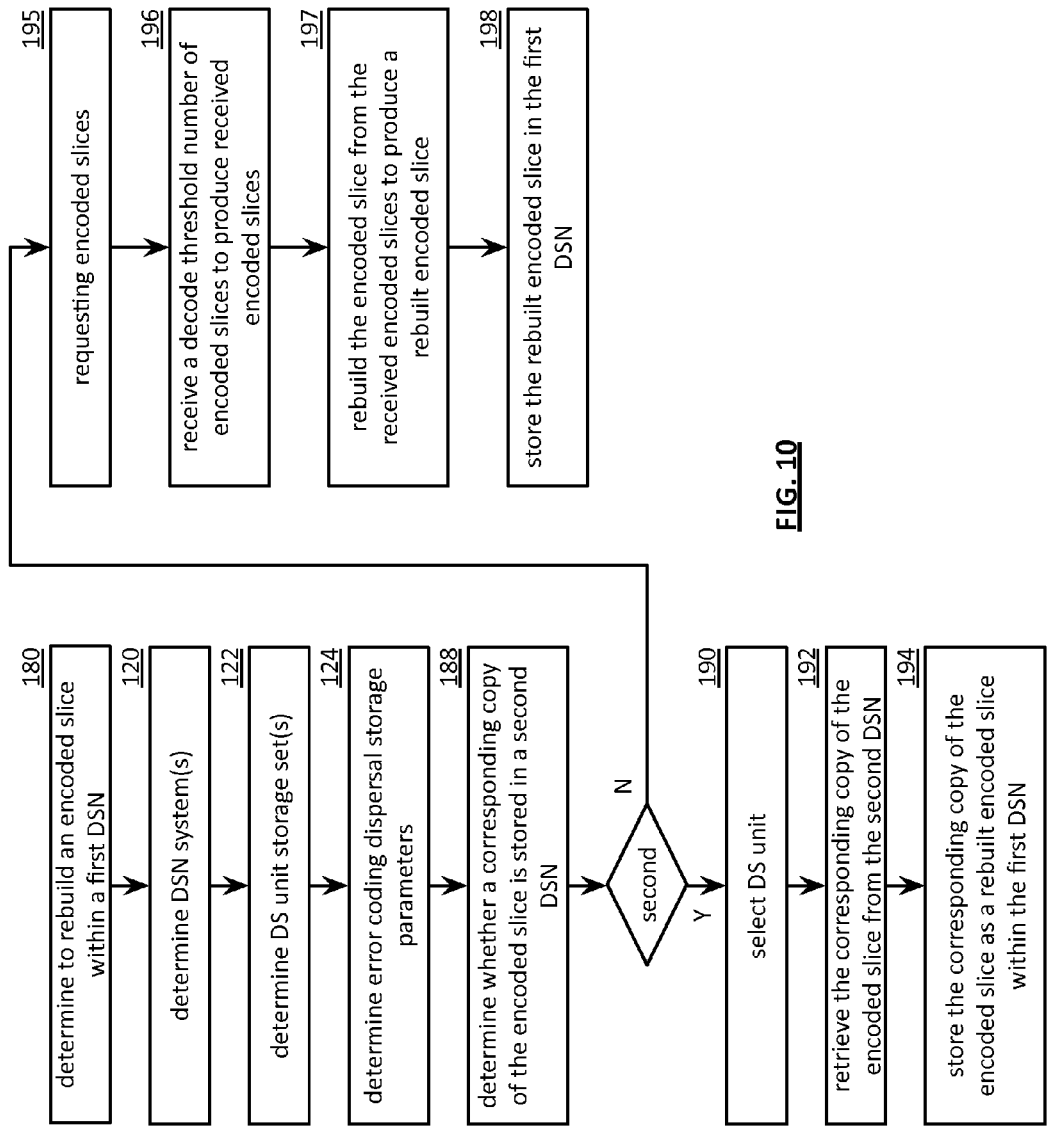
Figure 11:
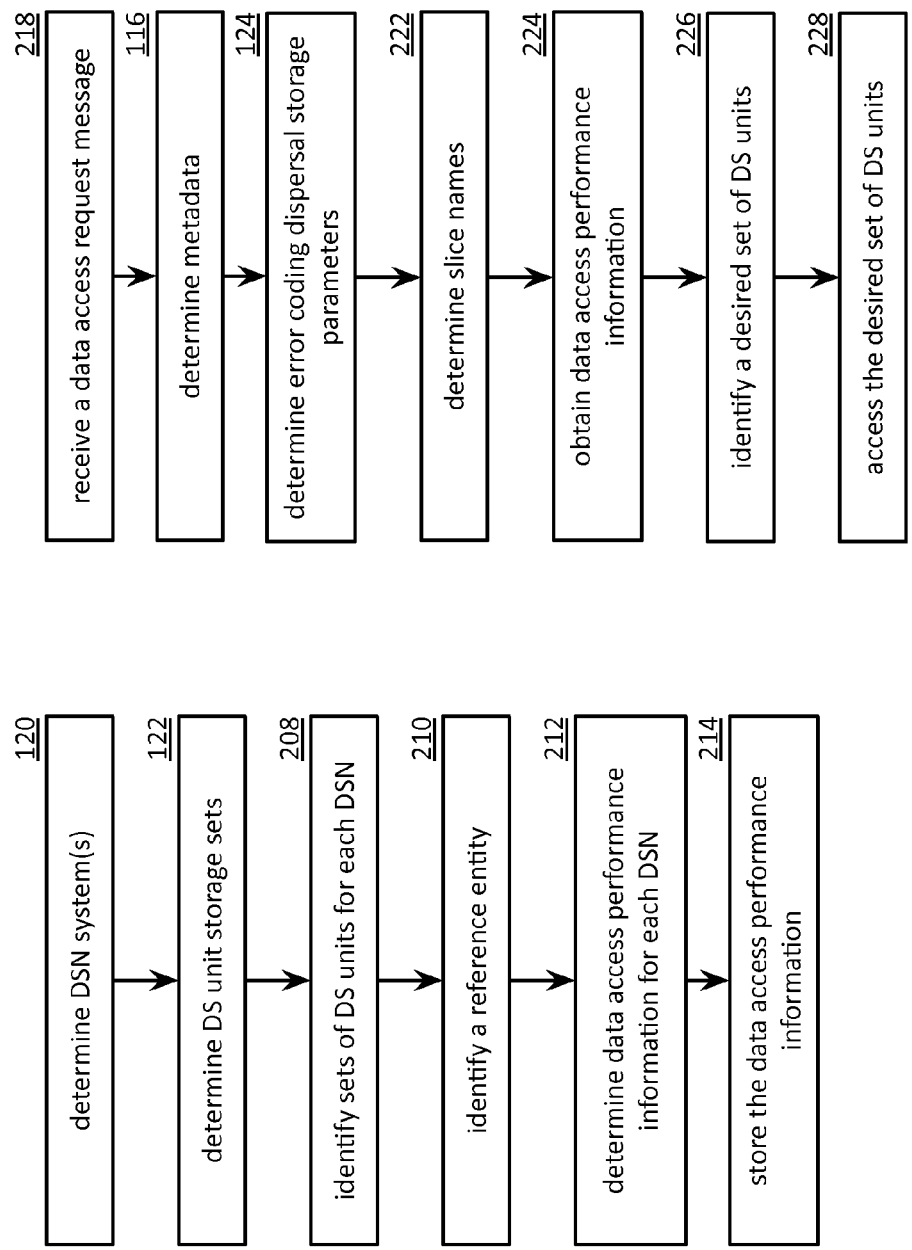
Figure 12:
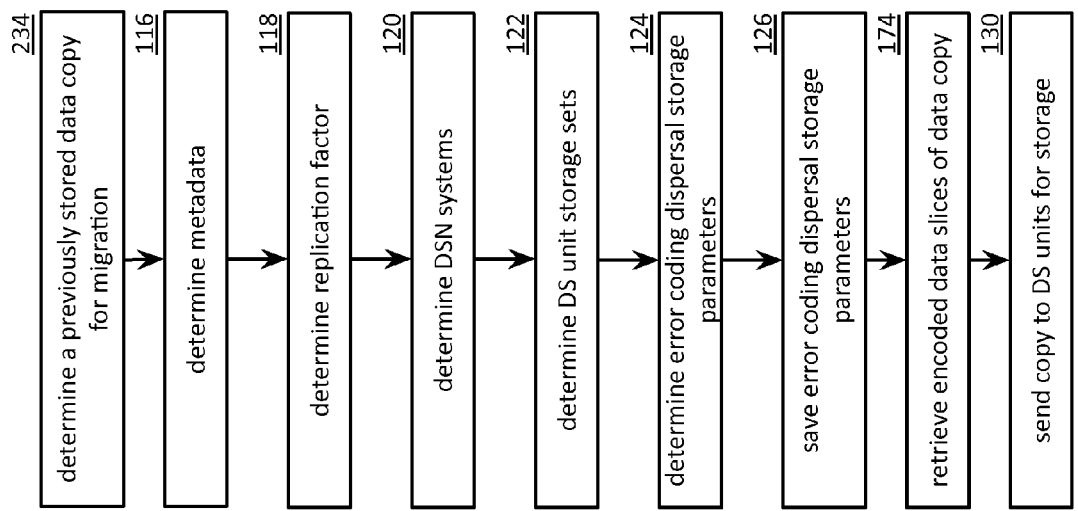
Figure 13:
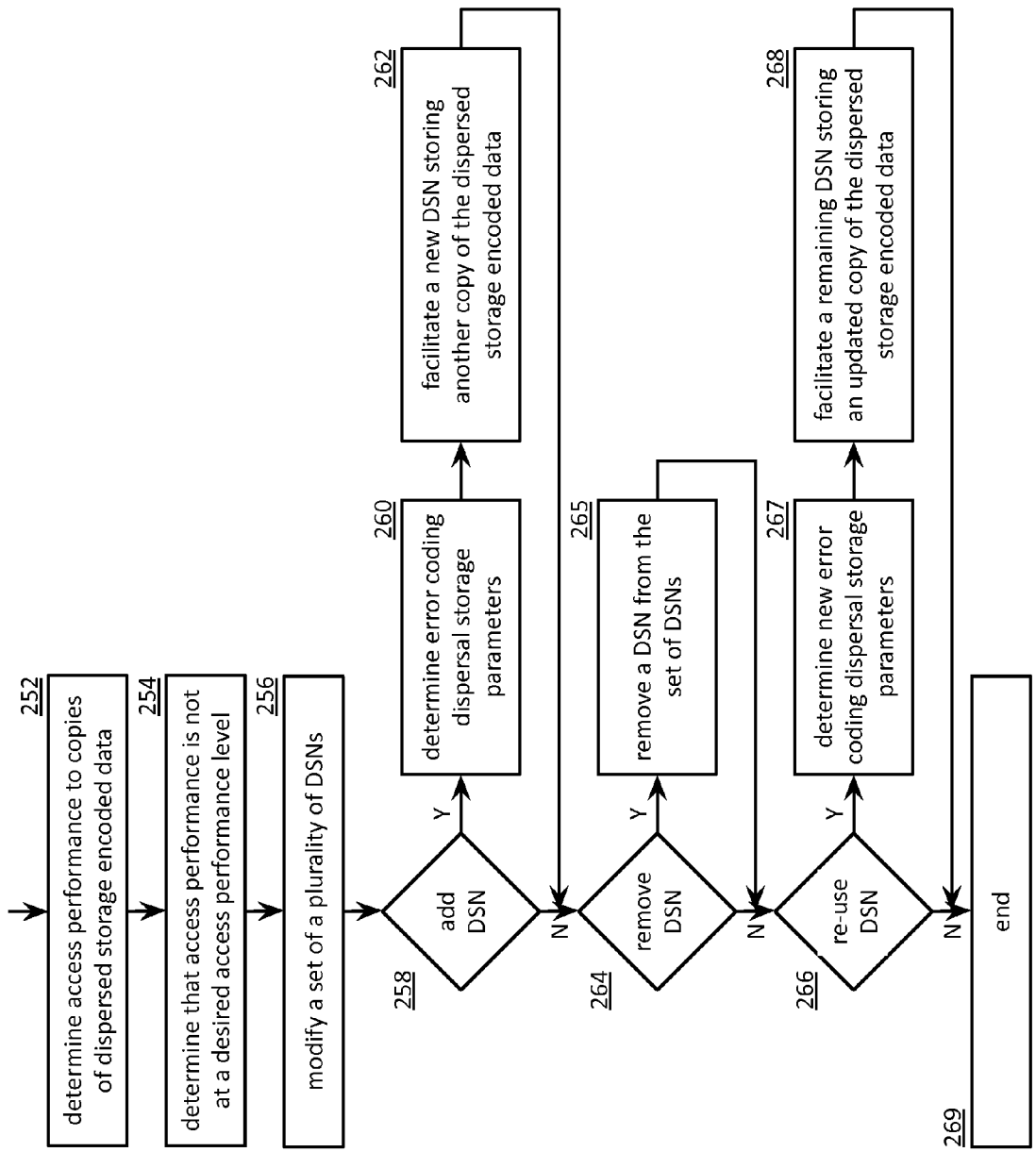
Figure 14:
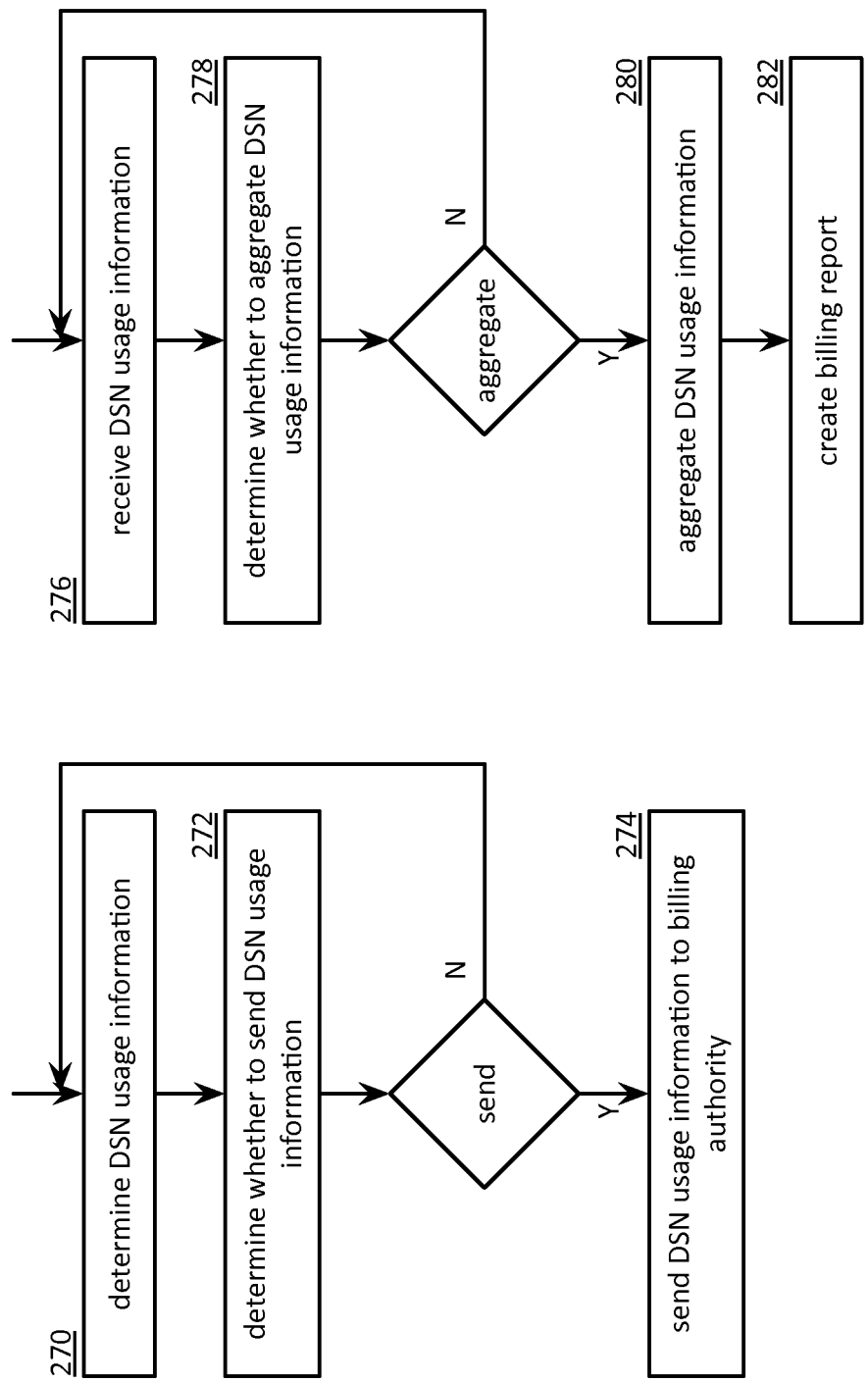
Figure 15:
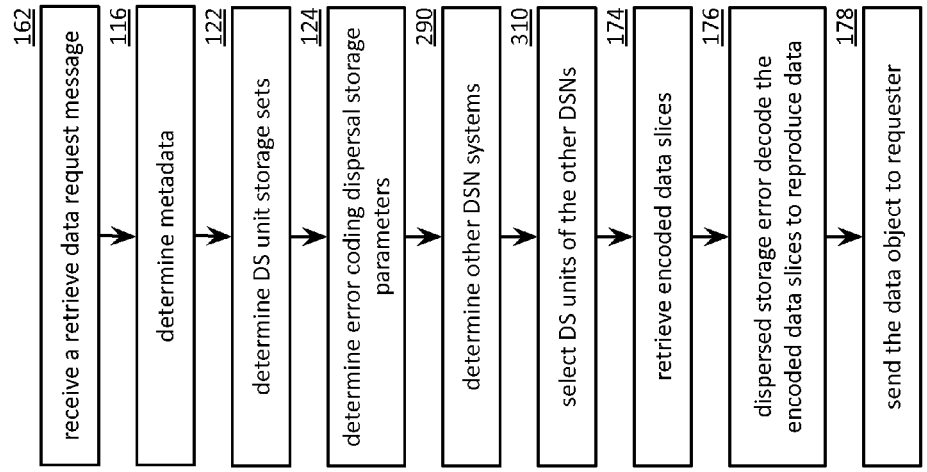
Figure 15:
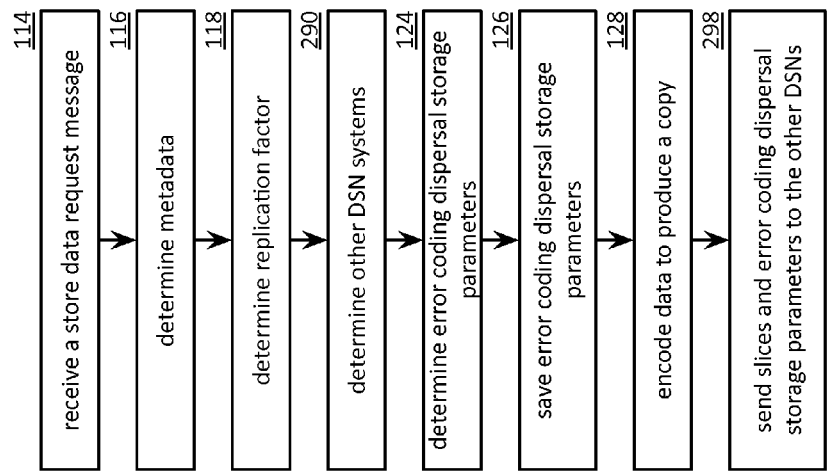
Figure 16:
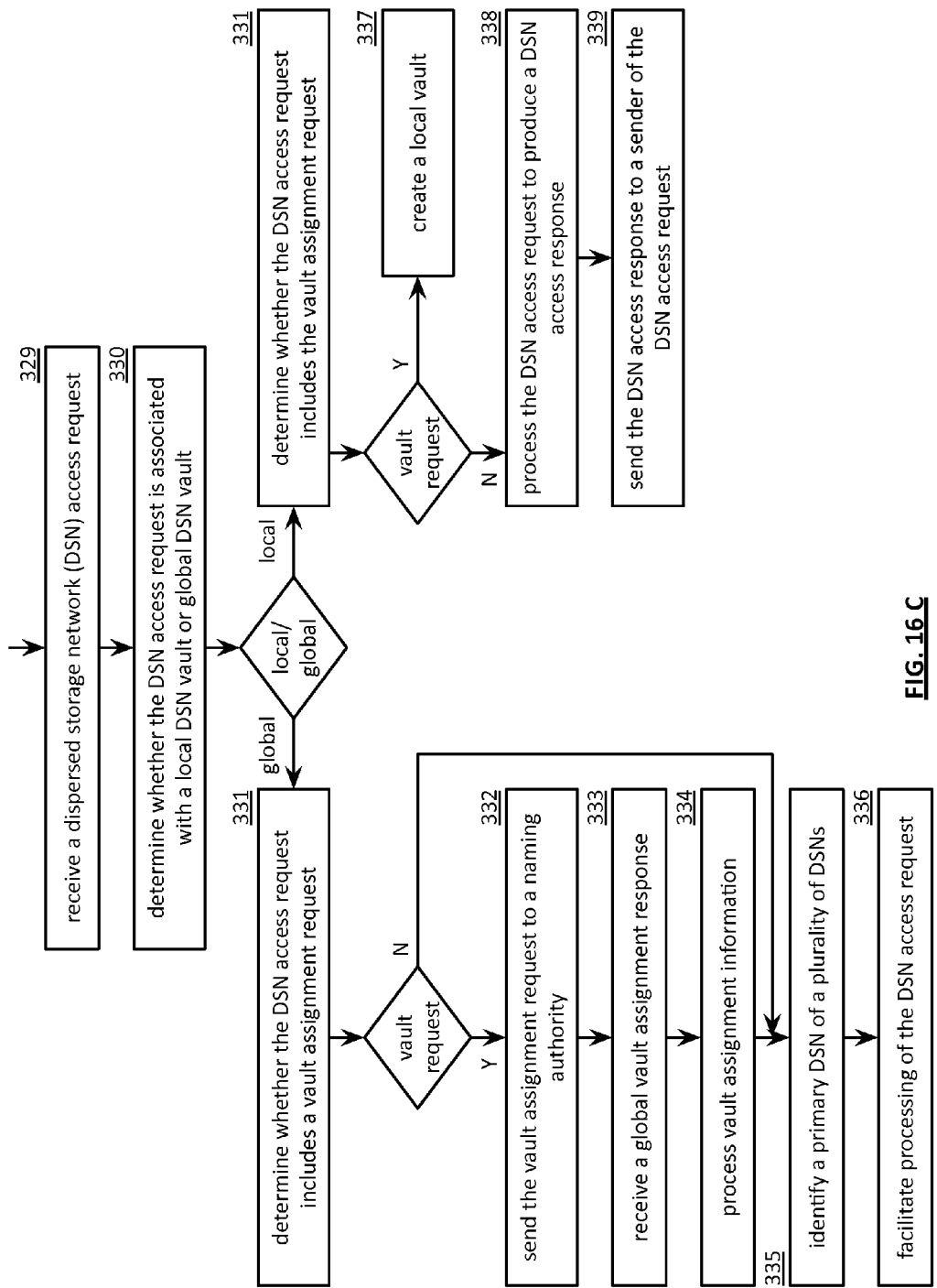
Figure 17:
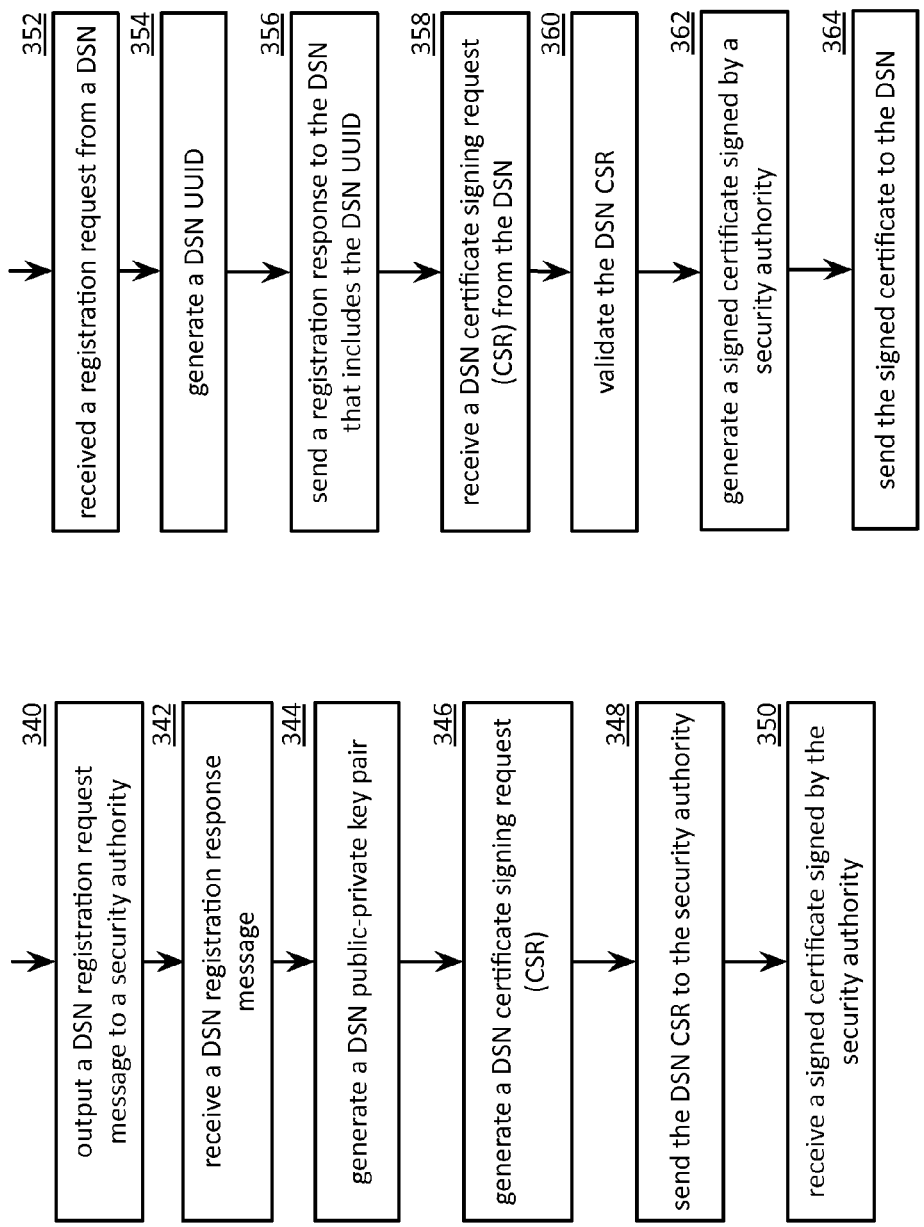
Figure 18:
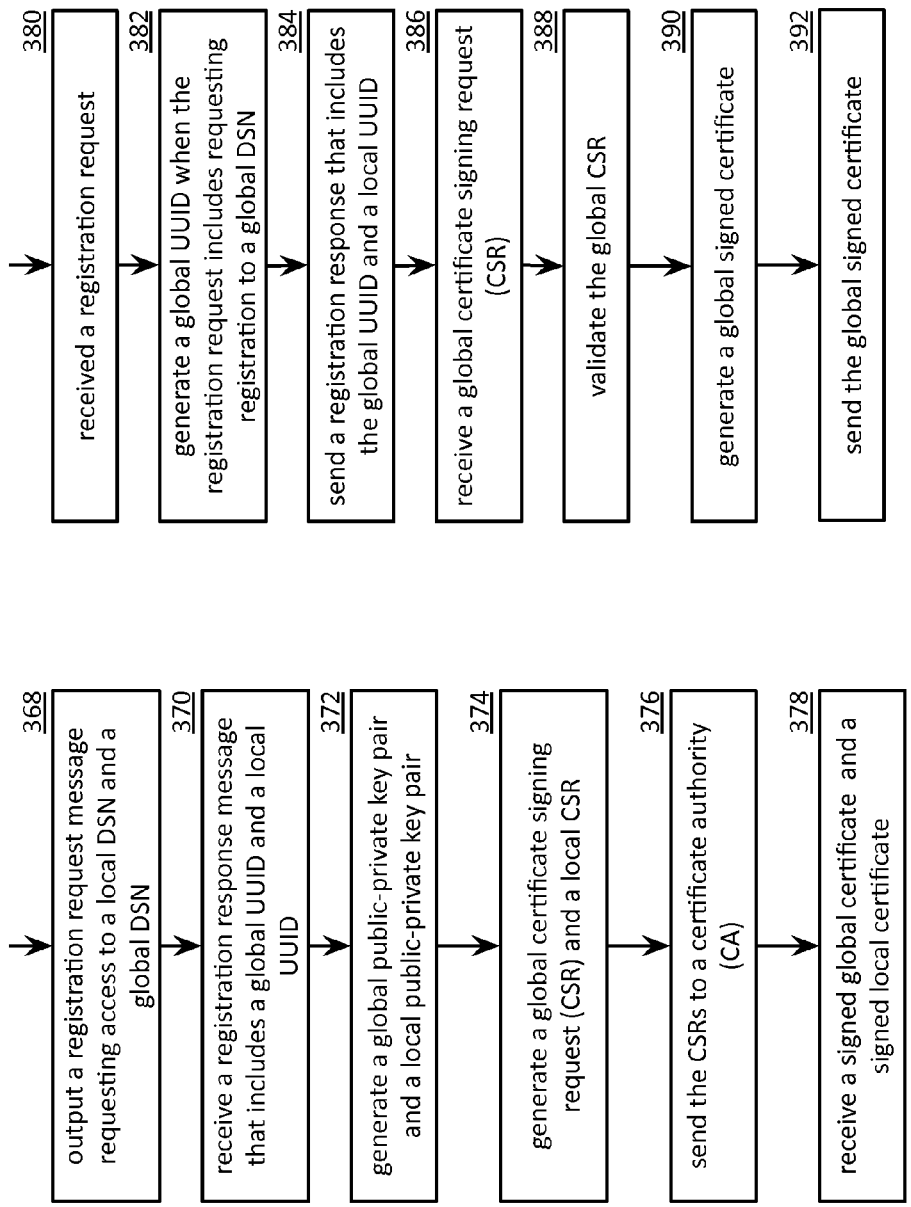
Figure 19:
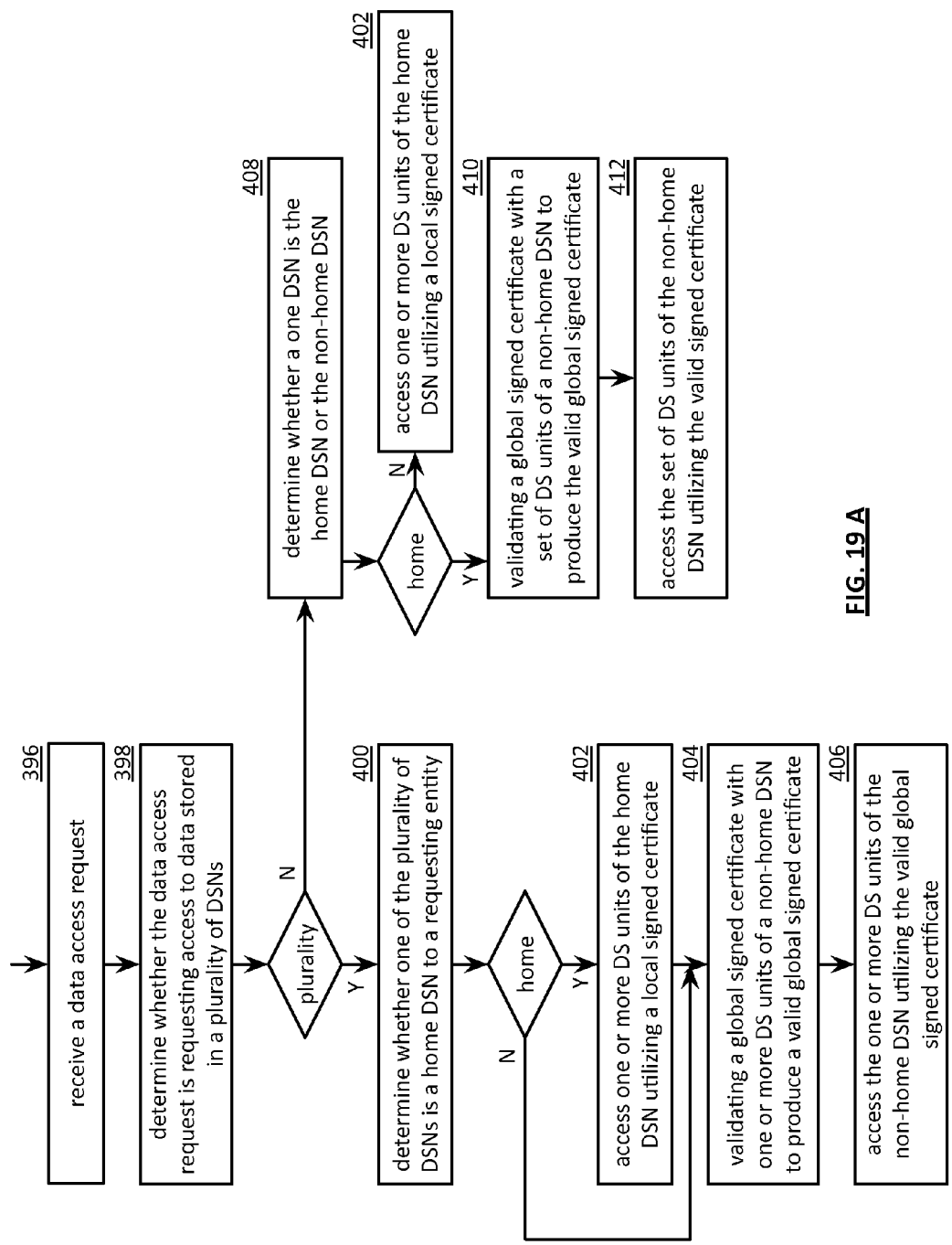
Figure 19:
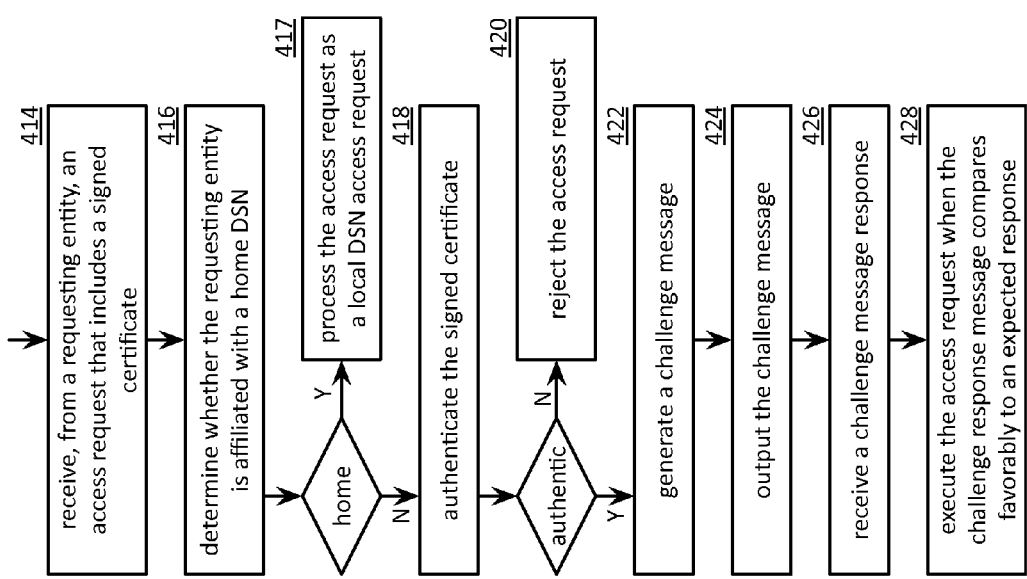

FIG. 8 A is a flowchart illustrating another example of storing data in accordance with the invention;

FIG. 8 B is a flowchart illustrating an example of authorizing encoded data slice storage in accordance with the invention;

FIG. 9 is a flowchart illustrating an example of retrieving data in accordance with the invention;

FIG. 10 is a flowchart illustrating an example of rebuilding data in accordance with the invention;

FIG. 11 A is a flowchart illustrating an example of publishing storage information in accordance with the invention;

FIG. 11 B is a flowchart illustrating another example of accessing data in accordance with the invention;

FIG. 12 is a flowchart illustrating an example of migrating data in accordance with the invention;

FIG. 13 is a flowchart illustrating an example of modifying the storage of data in accordance with the invention;

FIG. 14 A is a flowchart illustrating an example of generating billing information in accordance with the invention;

FIG. 14 B is a flowchart illustrating an example of aggregating dispersed storage network (DSN) usage information in accordance with the invention;

FIG. 15 A is a flowchart illustrating another example of storing data in accordance with the invention;

FIG. 15 B is a flowchart illustrating another example of retrieving data in accordance with the invention;

FIG. 16 A is a flowchart illustrating an example of assigning a new vault in accordance with the invention;

FIG. 16 B is a flowchart illustrating another example of assigning a new vault in accordance with the invention;

FIG. 16 C is a flowchart illustrating an example of accessing a dispersed storage network in accordance with the invention;

FIG. 17 A is a flowchart illustrating an example of acquiring security information in accordance with the invention;

FIG. 17 B is a flowchart illustrating an example of assigning security information in accordance with the invention;

FIG. 18 A is a flowchart illustrating another example of acquiring security information in accordance with invention;

FIG. 18 B is a flowchart illustrating another example of assigning security information in accordance with the invention;

FIG. 19 A is a flowchart illustrating an example of requesting access to a dispersed storage network (DSN) in accordance with the invention; and FIG. 19 B is a flowchart illustrating an example of processing a dispersed storage network (DSN) access request in accordance with the invention.

DETAILED DESCRIPTION OF THE INVENTION

Figure 1:
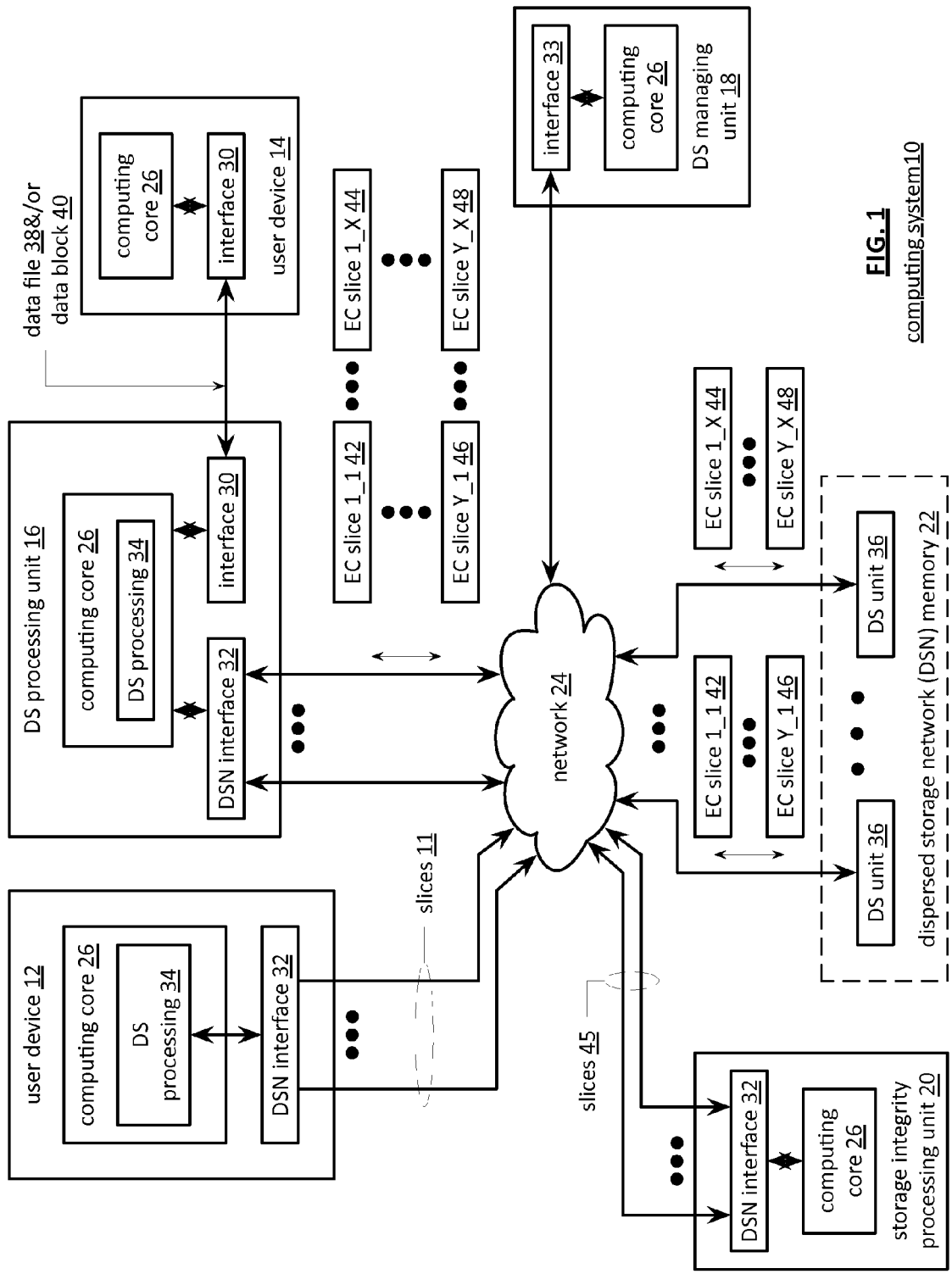
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-19 B.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices and/or unit's activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it send the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each slice 42-48, the DS processing unit 16 creates a unique slice name and appends it to the corresponding slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the slices 42-48 for transmission via the network 24.

The number of DS units 36 receiving the slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improved data storage integrity and security. Further examples of encoding the data segments will be provided with reference to one or more of FIGS. 2-19 B.

Each DS unit 36 that receives a slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
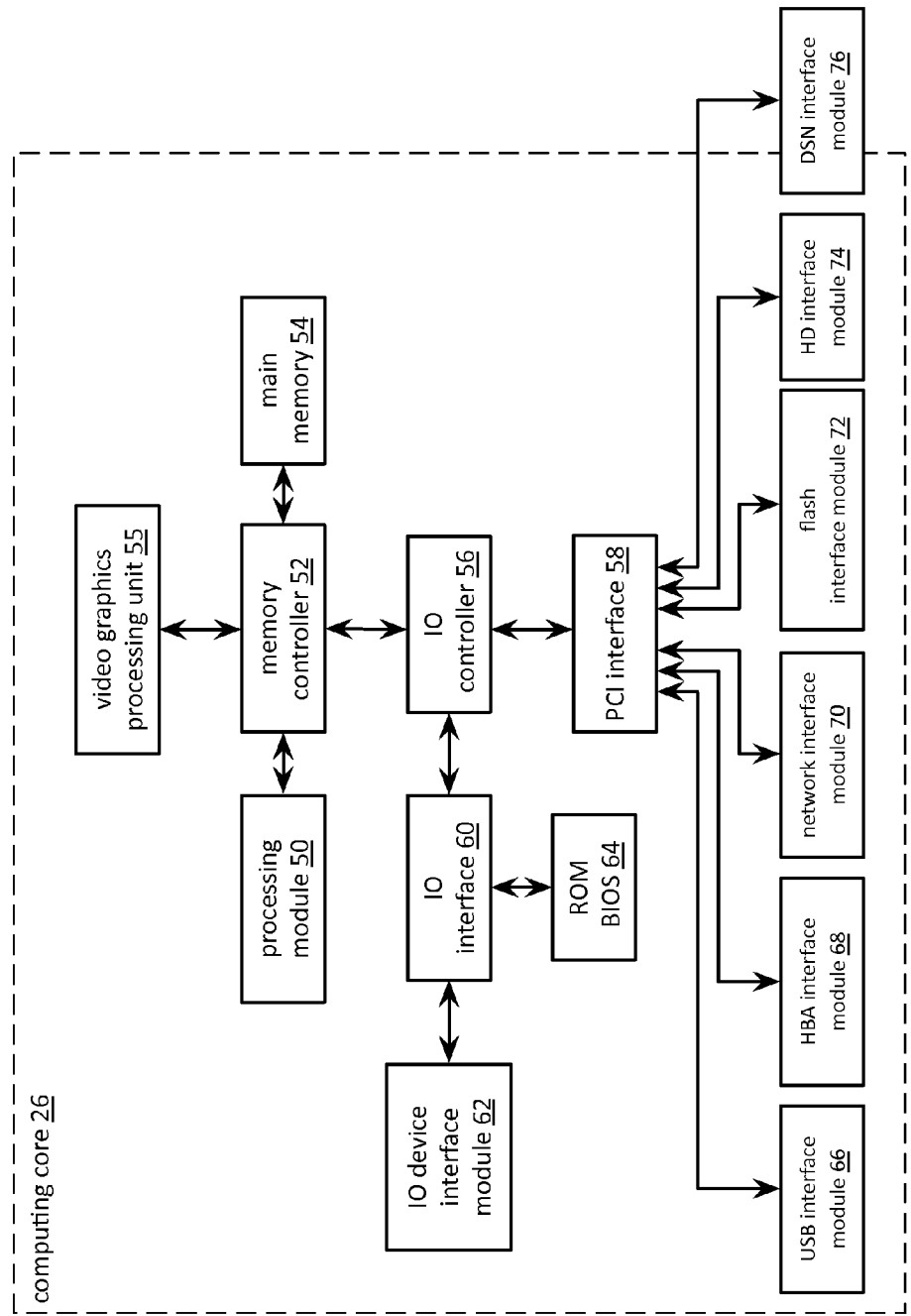
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-19 B.

Figure 3:
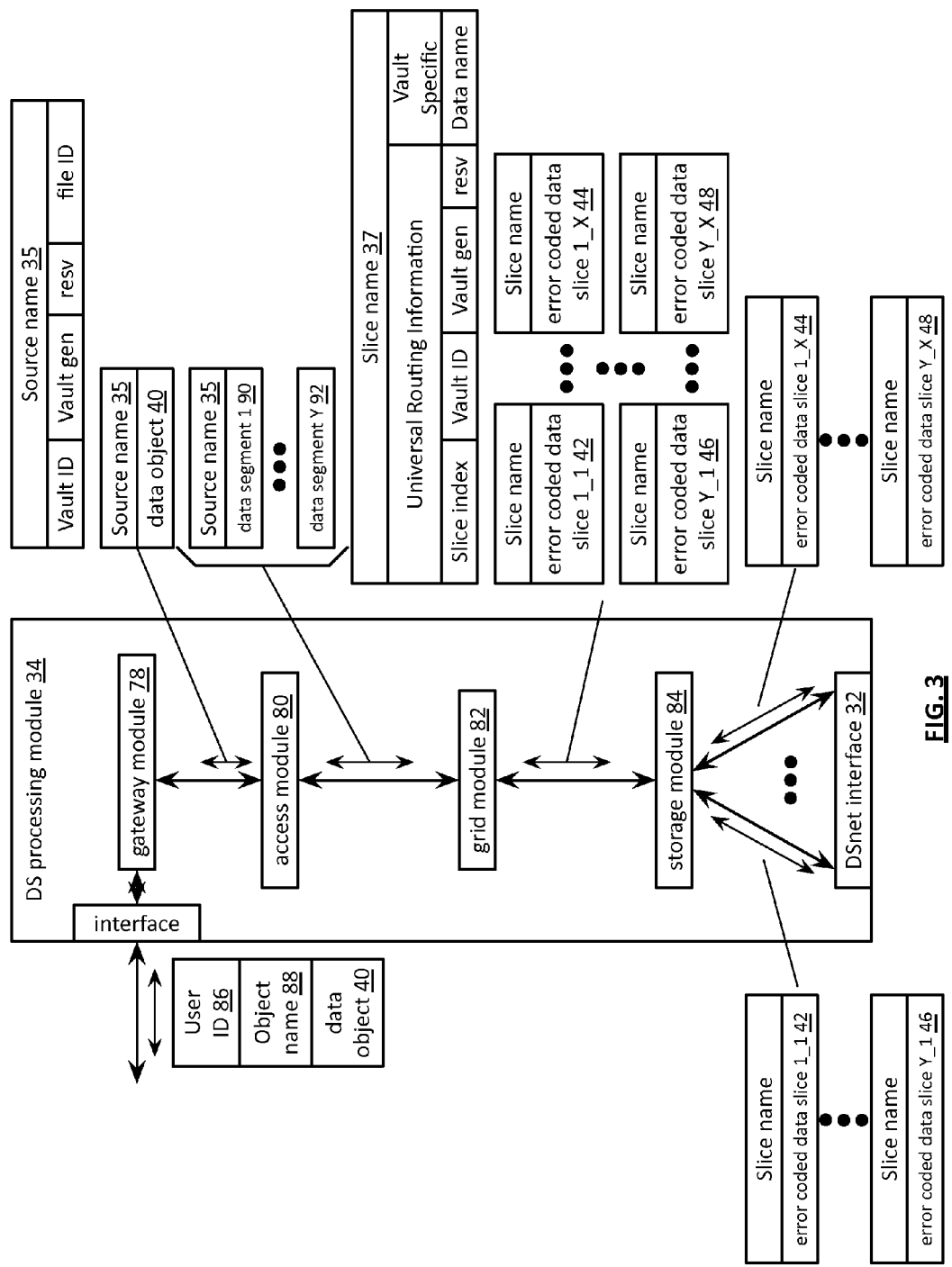
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user 12 or of the DS processing unit 14. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 60 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment sized is fixed, then the number of segments Y varies based on the size of data object. For instance, if the data object is an image file of 4,194,304 bytes and the fixed size of each segment is 4,096 bytes, the then number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X−T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 14, which authenticates the request. When the request is authentic, the DS processing unit 14 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X−T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
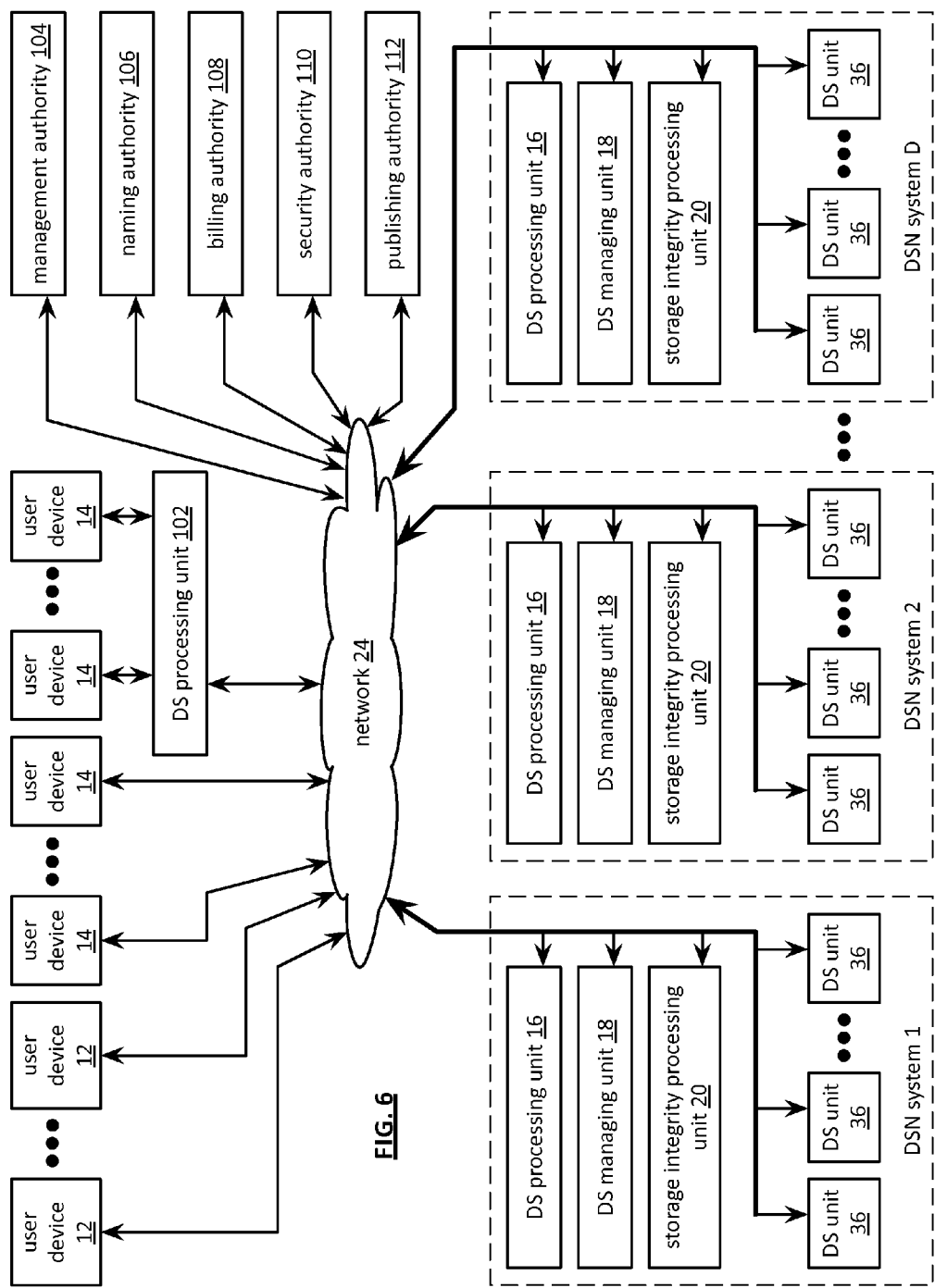
FIG. 6 is a schematic block diagram of another embodiment of a computing system in accordance with the invention.

FIG. 6 is a schematic block diagram of another embodiment of a computing system where one or more user devices may store and retrieve data from a plurality of dispersed storage networks (DSNs). Such a system includes one or more user devices 12, one or more user devices 14, a dispersed storage (DS) processing unit 102, a management authority 104, a naming authority 106, a billing authority 108, a security authority 110, a publishing authority 112, a network 24, and a plurality of DSN systems 1-D. Each of the DSN systems 1-D includes a plurality of DS units 36, a DS processing unit 16, a DS managing unit 18, and a storage integrity processing unit 20. The DS processing unit facilitates access to the plurality of DSNs 1-D for one or more user devices 14.

Each of the management authority 104, the naming authority 106, the billing authority 108, the security authority 110, and the publishing authority 112 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and 33.

A user device 12 of the one or more user devices 12 affiliates with a DSN system of the plurality of DSNs 1-D. For example, user device 12 affiliates with a home or local DSN system 2. As such, user device 12 normally stores and retrieve encoded data slices to/from a plurality of DS units 36 of DSN system 2 via the network 24. As another example, user device 14 stores and retrieves a data object to/from DS processing unit 16 of DSN system 1 via the network 24. As another example, user device 14 stores and retrieves the data object to/from the DS processing unit 102. Such a DS processing unit 102 may not be directly associated with a plurality of DS units 36. As such, DS processing unit 102 may be considered as a still further DSN system without specifically assigned DS units 36. As an implementation example, DS processing unit 102 is associated with an internet service provider (ISP) portal such that user device 14 gains access to the internet through a portal associated with the DS processing unit 102. The method of operation of the DS processing unit 102 is discussed in greater detail with reference to FIGS. 15 A-15 B.

In another example, the user devices 12-14 affiliate with one or more other DSN system(s) in addition to a local/home DSN system to facilitate access to DS units 36 of two or more DSN systems. For example, user device 12 affiliates with DSN system 1 and DSN system 2 such that the user device 12 may store and retrieve data slices to the DS units 36 of DSN system 1 and/or DSN system 2. For instance, user device 12 stores data slices of each pillar of a data segment in one or both of DSN system 1 and DSN system 2. As another instance, user device 12 stores data slices of 5 pillars in DSN system 1 and nothing in DSN system 2 when a pillar width is 5. As yet another instance, user device 12 stores data slices of 5 pillars in DSN system 1 and stores replicated data slices of all 5 pillars in DSN system 2 when the pillar width is 5. As a still further instance, user device 12 stores data slices of a first 3 of 5 pillars in DSN system 1 and stores data slices of a next 2 of 5 pillars in DSN system 2 when the pillar width is 5. The method of operation of a DS processing 34 of user device 12 and/or of DS processing 102 to store and/or retrieve data slices to a plurality of DSN systems is discussed in greater detail with reference to FIGS. 7-19 B.

Such a management authority 104 functions includes one or more of exchange of management information between two or more DS managing units 18, aggregation of management information, reporting of management information, provisioning of global vaults, provisioning of global identities, allocation of storage resources, and establishment of global operational parameters utilized by two or more of the DSN systems.

Such a naming authority 106 functions includes one or more of allocation of global virtual DSN address ranges, allocation of regional virtual DSN address ranges, exchange of naming information between two or more DS managing units 18, aggregation of naming information, reporting of naming information, and establishment of global naming parameters utilized by two or more of the DSN systems. For example, the naming authority 106 allocates a portion of a DSN virtual address range to be common as a global virtual DSN address range across each of the DSN systems 1-D. As another example, the naming authority 106 allocates a second portion of the DSN virtual address range to be common as a regional virtual DSN address range across a first portion and a second portion of the DSN systems 1-D. As such, a regional virtual DSN address range may be shared amongst two or more DSN systems. The method of operation of the naming authority 106 is discussed in greater detail with reference to FIGS. 16 A-16 B.

Such a billing authority 108 functions includes one or more of allocation of resources, exchanging of billing information between two or more DS managing units 18, determination of usage information, aggregation of billing information, balancing billing credits and debits, establishment of billing rates, utilization of billing rates, reporting of billing information, and establishment of global billing parameters utilized by two or more of the DSN systems. For example, the billing authority 108 determines billing information for user device 14 based on received DSN system 1 usage information for user device 14 and received DSN system 3 usage information for user device 14. The method of operation of the billing authority 108 is discussed in greater detail with reference to FIGS. 14 A-14 B.

Such a security authority 110 functions includes one or more of the creation of a root certificate, the processing of a digital signing request from an element of a DSN system, processing of a digital signing request from a user device 12-14, certificate validation, and root certificate distribution. For example, the security authority 110 processes a digital signing request from a DS managing unit 18 of DSN system 6. Next, the security authority 110 sends a root certificate to DS managing unit 18 when the security authority 110 determines that the digital signing request is valid. The method of operation of the security authority 110 is discussed in greater detail with reference to FIGS. 17 A-19 B.

Such a publishing authority 112 functions includes one or more of determination of storage locations of data slices for a data object, determination of replication of pillars across two or more of the DSN systems, a determination of estimated optimized DS unit 36 access performance, publication of storage location information, publication of performance information, and allocation of estimated performance information. For example, the publishing authority 112 determines that data slices of each pillar of a stored data object are stored in a set of DS units 36 of DSN system 2 in are replicated in a set of DS units 36 of DSN system 7. Next, the publishing authority 112 determines which of the set of DS units 36 of DSN system 2 and the set of DS units 36 of DSN system 7 have a best-estimated access performance with reference to DS processing unit 102. Next, publishing authority 112 publishes estimated access performance information with reference to DS processing unit 102 such that DS processing unit 102 may utilize the estimated access performance information in determining which DSN system to subsequently access (e.g., retrieve, store, delete, list) which pillars. The method of operation of the publishing authority 112 is discussed in greater detail with reference to FIGS. 11 A-11 B.

Figure 7:
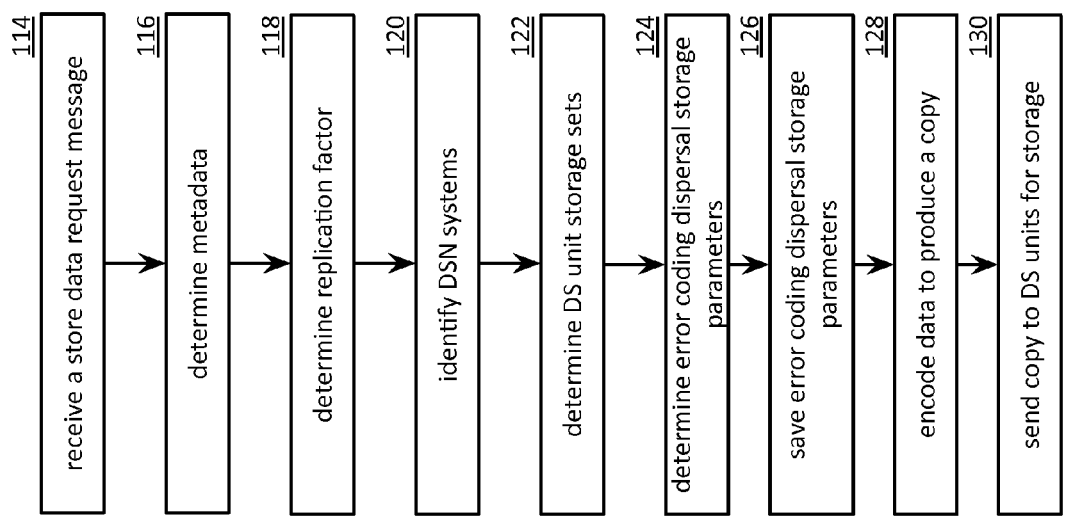
FIG. 7 is a flowchart illustrating an example of storing data in accordance with the invention.

FIG. 7 is a flowchart illustrating an example of storing data. The method begins with step 114 word processing module receives a store data request message from any one of a user device, a dispersed storage (DS) processing unit, a storage integrity processing unit, a DS managing unit, and a DS unit. Such a store data request message may include one or more of a user identifier (ID), a request code, a data ID, a data object, a data segment, a data block, a data type indicator, a data hash, a vault ID, a data size indicator, a priority indicator, a security indicator, storage requirements, and a performance indicator.

The method continues at step 116 where the processing module determines metadata. Such metadata may describe the data (e.g., the indicators and descriptors of the data object) and/or requirements for storage access (e.g., priority, performance, availability, reliability, geographic requirements). Such a determination may be based on one or more of a vault lookup, an affiliation indicator, a command, a message, a predetermination, a data object analysis, the data object name, the data object size, a data type, the data object, input metadata, the priority indicator, the security indicator, the performance indicator, and the storage requirements.

The method continues at step 118 where the processing module determines a replication factor. Such a replication factor indicates how many copies of the data shall be stored (e.g., as multiple sets of encode slices). Such a determination may be based on one or more of the data, requirements, the metadata, a message, a lookup, information received in the store data object message, and replication guidelines. For example, the processing module determines the replication factor to be 2 when the requirements indicate that a higher level of reliability is required. As another example, the processing module determines the replication factor to be 5 when the requirements indicate that broad geographic distribution is required to enable favorable copy retrieval performance (e.g., a desirable access latency).

The method continues at step 120 where the processing module identifies a plurality of dispersed storage networks (DSNs) for storing copies of dispersed storage encoded data based on global data retrieval accesses of the copies of the dispersed storage encoded data. Such a determination may be based on one or more of the replication factor, available DSN systems, DSN system attributes, the data, the requirements, the metadata, a message, and a lookup. For example, the processing module determines to store data slices and replicated data slices in DSN systems 1 and 6 when the DSN system attributes match the storage requirements (e.g., closer geographic proximity of the DSN systems to the user device). The processing module may determine the global data retrieval accesses based on one or more of quantity of retrieval accesses, a data type of the data, a data size indicator of the data, a user device geographic affiliation, a dispersed storage processing unit geographic affiliation, a geographic requirement, a DSN geographic affiliation, a retrieval latency requirement, a DSN performance level, an availability requirement, a reliability requirement, a predetermination, and a user identifier (ID).

The method continues at step 122 where the processing module determines DS unit storage sets for each of the DSN systems. Such a determination may be based on one or more of the identified DSNs, the replication factor, available DS unit storage sets, DS unit storage set attributes, the data object, the requirements, the metadata, a message, and a lookup. For example, the processing module determines the DS unit storage sets that are closest to an associated DS processing module based on the DS unit storage set attributes.

The method continues at step 124 where the processing module determines a set of error coding dispersal storage parameters for at least one of the plurality of DSNs based on local data retrieval accesses allocated to the at least one of the plurality of DSNs. The processing module determines the local data retrieval accesses for each of the plurality of DSNs based on an allocation portion of the global data retrieval accesses the processing module determines the allocation portion based on one or more of the global data retrieval accesses, information received in the store data request message, the data, the replication factor, the metadata, the DSN systems, the DS unit storage sets, a vault lookup, a command, a message, and a predetermination.

At step 124 processing module determines a second set of error coding dispersal storage parameters for at least a second one of the plurality of DSNs based on second local data retrieval accesses allocated to the at least the second one of the plurality of DSNs. For example, the processing module determines a common decode threshold for each of the set and second set of error coding dispersal storage parameters to enable utilization of replicated slices between DSNs. Next, the processing module determines a first plurality of parameter subsets for the set of error coding dispersal storage parameters, which includes a first pillar width, a first write threshold, and a first read threshold and the processing module determines a second plurality of parameter subsets for the second set of error coding dispersal storage parameters, which includes a second pillar width, a second write threshold, and a second read threshold.

The method continues at step 126 where the processing module facilitates storage of the error coding dispersal storage parameters and/or facilitates storage of a plurality of DSN identifiers (IDs), wherein each DSN ID of the plurality of DSN IDs corresponds to a DSN of the plurality of DSNs (e.g., to facilitate subsequent access to the copies). The method continues at step 128 where the processing module encodes data in accordance with the set of error coding dispersal storage parameters to produce a copy of the copies of the dispersed storage encoded data. The method continues at step 130 where the processing module outputs the copy of the copies of the dispersed storage encoded data to the at least one of the plurality of DSNs.

FIG. 8A is another flowchart illustrating another example of storing data, which includes similar steps to FIG. 7. The method begins with steps 114, 116, 118, and 120 of FIG. 7 where a processing module receives a store data request message, determines metadata, determines the replication factor, and identifies a plurality of dispersed storage networks (DSNs). The method continues at step 140 where the processing module determines a local DS unit storage set for a local DSN of the DSNs. Such a determination may be based on one or more of the local DSN, the replication factor, available DS unit storage sets, DS unit storage set attributes, data, requirements, the metadata, a message, and a lookup. For example, the processing module determines the local DS unit storage set that is closest to an associated user device based on local DS unit storage set geographic attributes.

The method continues at step 142 where the processing module determines that a set of the plurality of DSNs have substantially similar local data retrieval accesses. Next, the processing module determines a set of error coding dispersal storage parameters for a set of the plurality of DSNs. The method continues at step 126 of FIG. 7 where the processing module saves the set of error coding dispersal storage parameters.

The method continues at step 146 where the processing module encodes, by one of the set of DSNs, data in accordance with the set of error coding dispersal storage parameters to produce a plurality of sets of encoded data slices. The method continues at step 148 where the processing module stores, by the one of the set of DSNs, the plurality of sets of encoded data slices within the one of the set of DSNs. For example, the processing module sends the plurality of sets of encoded data slices to the local DS unit storage set for storage therein.

The method continues at step 150 where the processing module outputs, by the one of the set of DSNs, the plurality of sets of encoded data slices to other DSNs of the set of the plurality of DSNs for storage therein (e.g., when storing replicated slices). For example, the processing module sends all pillars of the plurality of sets of encoded data slices to the other DSNs for storage therein. As another example, the processing module sends an encoded data slice of a first pillar to a DS unit of the local DSN system and sends the encoded data slice to a second DSN system for storage in a DS unit of the second DSN system. As yet another example, the processing module sends a decode threshold number of encoded data slices to DS units of the local DSN system and sends other encoded data slices to a second DSN system for storage in DS units of the second DSN system. As stills another example, the processing module sends the encoded data slices such that all pillars are stored in a similar geographic region but in two or more DSN systems. For instance, the first half of the pillars may be stored in DS units of the desired geographic region in the first DSN system and the second half of the pillars may be stored in DS units of the desired geographic region in the second DSN system.

FIG. 8 B is another flowchart illustrating an example of authorizing encoded data slice storage. The method begins with step 152 where a processing module receives, by a second one of at least one of a plurality of dispersed storage networks (DSNs), a copy of copies of dispersed storage encoded data from a first one of the at least one of the plurality of DSNs. Such a copy may include one or more of a requester identifier (ID), one or more sets of encoded data slices, and error coding dispersal storage parameters.

The method continues at step 154 where the processing module determines whether a requester is authorized to access the second one of the at least one of the plurality of DSNs. Such a determination may be based on one or more of the requester ID, a vault ID, a user ID, a data object name, a slice name, a source name, a root certificate, a DSN digital certificate, a user device certificate, a dispersed storage (DS) processing module of the first DSN system certificate, a security authority query, a DS managing unit query, an authorization record lookup, a command, and a message. For example, the processing module determines that the requester is authorized to the second one of the at least one of the plurality of DSNs when each certificate is valid and the requester ID is authorized to access the second one of the at least one of the plurality of DSNs as indicated by a authorization record lookup.

The method branches to step 158 when the processing module determines that the requester is authorized to access the second one of the at least one of the plurality of DSNs. The method ends with step 156 when the processing module determines that the requester is not authorized to access the second one of the at least one of the plurality of DSNs. At step 156, the processing module sends an un-authorized message to one or more of the requester, a DS processing module, a DS managing unit, a first DSN system, a management authority, and a security authority.

The method continues at step 158 where the processing module determines, by the second one of the at least one of the plurality of DSNs, a set of local DS units. Such a determination may be based on one or more of received error coding dispersal storage parameters, identified DSN systems, a replication factor, available DS unit storage sets (e.g. of the second one of the at least one of the plurality of DSNs), DS unit storage set attributes, encoded data slices, storage requirements, metadata, a message, and a lookup. For example, the processing module determines the local DS unit storage set that is closest to a DS processing module based on the local DS unit storage set attributes. The method continues at step 160 where the processing module stores a plurality of sets of encoded data slices of the copy of the copies of the dispersed storage encoded data within the set of local DS units.

In addition, the processing module may identify, by the second one of the at least one of the plurality of DSNs, a third one of the at least one of the plurality of DSNs and output, by the second one of the at least one of the plurality of DSNs, the copy of the copies of the dispersed storage encoded data to the third one of the at least one of the plurality of DSNs.

FIG. 9 is a flowchart illustrating an example of retrieving data, which include similar steps to FIG. 7. The method begins at step 162 where a processing module receives a retrieve data request message from a requester (e.g., from a user device). Such a retrieve data request message may include one or more of a user ID, a request, a data object name, a date to identifier (ID), a data type indicator, a data object hash, a vault ID, a data size indicator, a priority indicator, a security indicator, storage requirements, and a performance indicator. The method continues with steps 116-124 of FIG. 7 where the processing module determines metadata, determines a plurality of dispersed storage networks (DSNs), determines dispersed storage (DS) storage sets, and determines error coding dispersal storage parameters.

The method continues at step 172 where the processing module selects DS units from the DS unit storage sets. Such a selection may be based on one or more of the metadata, the error coding dispersal storage parameters, retrieval requirements, the DSN systems, a DSN lookup table access, the DS unit storage sets, DS unit attributes, DS unit status, estimated DS unit performance, estimated DS units reliability, estimated DS unit availability, and DS unit cost. Encoded data slice may be retrieved from two or more DS units where the two or more DS storage units are part of two or more DSN systems. As such, a data slice and a copy of the data slice may have been replicated in two or more DS units. For example, the processing module selects DS units corresponding to less than a decode threshold number of pillars from a first DSN system where the DS units have favorable estimated performance and the processing module selects DS units from a second DSN system corresponding to pillars to complete a decode threshold number of pillars in total from the two DSN systems such that DS units of the second DSN system have favorable estimated performance.

The method continues at step 174 where the processing module retrieves at least a decode threshold number of encoded data slices from the selected DS units by sending the DS units one or more retrieve encoded data slice request messages. Next, the processing module receives at least a decode threshold number of encoded data slices from at least some of the selected DS units. The method continues at step 176 where the processing module dispersed storage error decodes the at least the decode threshold number of encoded data slices to reproduce data in accordance with the error coding dispersal storage parameters. The method continues at step 178 where the processing module sends the reproduced data to the requester.

FIG. 10 is a flowchart illustrating an example of rebuilding data that includes similar steps to FIG. 7. The method begins with step 180 where a processing module determines a slice name of an encoded slice to be rebuilt within a first dispersed storage network (DSN). Such determining includes at least one of determining a slice name of a missing encoded slice as the slice name of the encoded slice to be rebuilt, determining a slice name of an encoded slice associated with an unfavorable integrity indication to produce the slice name of the encoded slice to be rebuilt, determining a slice name of an encoded slice associated with an unfavorable comparison of retrieved replicated encoded slices from two or more DSNs to produce the slice name of the encoded slice to be rebuilt, and receiving the slice name of the encoded slice to be rebuilt. The method continues with steps 120-124 of FIG. 7 where the processing module determines DSN systems, determines dispersed storage (DS) unit storage sets, and determines error coding dispersal storage parameters.

The method continues at step 188 where the processing module determines whether a corresponding copy of the encoded slice is stored in a second DSN. Such determining begins with determining whether the first and second DSNs are each storing an encoded copy of a data file (e.g., based on the determination of the DSN systems, and a slice name to DSN table lookup). Next, the processing module determines whether the first and second DSNs utilizes a similar set of error coding dispersal storage parameters to produce the encoded copy of the data file that includes a plurality of sets of encoded slices, when the first and second DSNs are each storing the encoded copy of the data file. The processing module determines that the corresponding copy of the encoded slice is stored in the second DSN when the first and second DSNs are using the similar set of error coding dispersal storage parameters. The method continues to step 190 when the processing module determines that the corresponding copy of encoded slice is stored in the second DSN.

Next, the processing module determines whether the first and second DSNs utilizes a similar decoding threshold when the first and second DSNs are not using the similar set of error coding dispersal storage parameters. The processing module determines whether the encoded slice is an encoded data slice or an encoded parity slice when the first and second DSNs utilize the similar decoding threshold. The processing module determines that the corresponding copy of the encoded slice is not stored in the second DSN when the encoded slice is the encoded parity slice (e.g., different pillar widths lead to different party slices). The method branches to step 195 when the processing module determines that the corresponding copy of encoded slice is not stored in the second DSN. The processing module determines that the corresponding copy of the encoded slice is stored in the second DSN when the encoded slice is the encoded data slice (e.g., same size unity matrix is included in encoding matrices utilized to encode data into the same encoded data slices pillar by pillar for the decode threshold number of encoded data slices). The method continues to step 190 when the processing module determines that the corresponding copy of encoded slice is stored in the second DSN.

The method continues at step 190 where the processing module selects a corresponding DS unit from a DS unit storage set associated with the second DSN of the DS unit storage sets. Such a selection may be based on one or more of the slice name, a pillar identifier (ID) associated with the slice name, a DS unit to pillar ID association, a slice name to DS unit table lookup, metadata, the error coding dispersal storage parameters, rebuild requirements, the DSN systems, the DS unit storage sets, DS unit attributes, DS unit status, estimated DS unit performance, estimated DS units reliability, estimated DS unit availability, and DS unit cost.

The method continues at step 192 where the processing module retrieves the corresponding copy of the encoded slice from the second DSN when the corresponding copy of the encoded slice is stored in the second DSN. For example, the processing module sends an encoded slice read request message to the DS unit of the second DSN, wherein the message includes the slice name. Next, the processing module receives the encoded slice. The method continues at step 194 where the processing module stores the corresponding copy of the encoded slice as a rebuilt encoded slice within the first DSN. For example, the processing module sends a write request message to a corresponding DS unit of the first DSN, wherein the message includes the encoded slice and the slice name.

The method continues at step 195 where the processing module requests a set of encoded slices from at least one of the first and second DSNs, wherein the set of encoded slices includes the encoded slice when the corresponding copy of encoded slice is not stored in the second DSN. Such requesting may include one or more of determining whether to request the set of slices from the first DSN, the second DSN, or a combination of the first and second DSNs based on network status and sending a set of encoded slice read request messages, wherein the request messages include a corresponding set of slice names. Such a set of slice names includes slice names associated with a decode threshold number of encoded slices subsequently utilized to rebuild the encoded slice and may not include the slice name. Such a network status may include one or more of a network utilization level, a network bandwidth availability indicator, a DSN status indicator, a DSN performance level indicator, and a DSN capacity indicator.

The method continues at step 196 where the processing module receives a decode threshold number of encoded slices of a set of encoded slices to produce received encoded slices. The method continues at step 197 where the processing module rebuilds the encoded slice from the received encoded slices to produce a rebuilt encoded slice. Such rebuilding may be accomplished by a processing module of the first DSN or the second DSN. The method continues at step 198 where the processing module stores the rebuilt encoded slice in the first DSN.

As an example of steps 195-198, the first DSN requests the set of encoded slices from the at least one of the first and second DSNs and the first DSN receives the received encoded slices from the at least one of the first and second DSNs. Next, the first DSN rebuilds the encoded slice from the received encoded slices to produce a rebuilt encoded slice and the first DSN stores the rebuilt encoded slice in the first DSN.

As another example of steps 195-198, the second DSN requests the set of encoded slices from the at least one of the first and second DSNs and the second DSN receives the received encoded slices from the at least one of the first and second DSNs. Next, the second DSN rebuilds the encoded slice from the received encoded slices to produce a rebuilt encoded slice and the second DSN sends the rebuilt encoded slice to the first DSN. Next, the first DSN stores the rebuilt encoded slice in the first DSN.

FIG. 11A is a flowchart illustrating an example of publishing storage information, which includes similar steps to FIG. 7. The method begins with steps 120-122 of FIG. 7 where a processing module (e.g., of a publishing authority) determines a plurality of dispersed storage networks (DSNs) of a computing system network and determines a plurality of dispersed storage (DS) unit storage sets within each of the DSNs. The method continues at step 208 where the processing module identifies sets of DS units for each of the plurality of dispersed storage networks (DSNs) in the computing system network, wherein a set of the sets of DS unit stores an error coded data file. Such an error coded data file may include a plurality of sets of encoded data slices, wherein the data file is dispersed storage error encoded to produce the plurality of sets of encoded data slices. Such identification may be based on one or more of obtaining (e.g., receiving, extracting from a list) an error coded data file identifier (ID) associated with the error coded data file, a source name associated with the error coded data file ID, a source name range, a slice name range, a source name to physical location table lookup, a retrieve data request message, a store data request message, available sets of DS units, DS unit attributes, and metadata.

The method continues at step 210 where the processing module identifies a reference entity within the computing system network. Such an identification may be based on one or more of a reference entity list lookup, a user device to reference entity list lookup, a DS processing unit to reference entity list lookup, a DS processing module to reference entity list lookup, a computing system network topology, and a next reference entity in a reference entity sequence. In addition, the processing module may identify a second reference entity within the computing system network.

The method continues at step 212 where the processing module determines first data access performance information between the reference entity and a first one of the sets of DS units and determines second data access performance information between the reference entity and a second one of the sets of DS units for each of the plurality of DSNs. In addition, when utilizing a second reference entity, the processing module determines third data access performance information between the second reference entity and the first one of the sets of DS units and determines fourth data access performance information between the second reference entity and the second one of the sets of DS units for each of the plurality of DSNs.

Such a determination of the performance information may include one or more of determining a likelihood of retrieving a decode threshold number of encoded data slices of at least a portion of the error coded data file, determining data retrieval access latency for retrieving the decode threshold number of encoded data slices, and generating the data access performance information based on the likelihood of retrieving the decode threshold number of encoded data slices and the data retrieval access latency.

Alternatively, such a determination of the performance information may include one or more of determining a likelihood of storing a write threshold number of encoded data slices of the at least a portion of the error coded data file, determining data write access latency for storing the write threshold number of encoded data slices, and generating the data access performance information based on the likelihood of storing the write threshold number of encoded data slices and the data write access latency.

The method continues at step 214 for the processing module stores the first and second data access performance information for each of the plurality of DSNs to produce system data access performance information. In addition, the processing module stores the third and fourth data access performance information for each of the plurality of DSNs as part of the system data access performance information when utilizing a second reference entity. In addition, the processing module may update previous data access performance information with current data access performance information to produce the data access performance information. In addition, the processing module may output the data access performance information to an accessing device such that the accessing device determines specific data access performance information based on the reference entity's data access performance information. For example, the processing module outputs the data access performance information on a timed basis. As another example, the processing module outputs the data access performance information in response to a request.

FIG. 11B is another flowchart illustrating another example of accessing data, which includes similar steps to FIG. 7. Such a data access method may be utilized in a computing system network that includes a plurality of dispersed storage networks (DSNs), wherein each of the plurality of DSNs includes sets of dispersed storage (DS) units, and wherein a set of the sets of DS unit stores an error coded data file. The method begins at step 218 where a processing module (e.g., of a user device) receives a data access request message (e.g., read, write, delete, list, etc.). The method continues with steps 116 and 124 of FIG. 7 where the processing module determines metadata and determines error coded dispersal storage parameters.

The method continues at step 222 where the processing module determines slice names corresponding to the error coded data file. Such a determination may be based on one or more of a file name, a file identifier (ID), a user device ID, a user ID, a vault ID, a directory entry, a directory lookup, a source name retrieval, a source name lookup.

The method continues at step 224 where the processing module contains a reference entity's data access performance information. Such reference entity's data access performance information includes, for each of the plurality of DSN first data access performance information between the reference entity and a first one of the sets of DS units and second data access performance information between the reference entity and a second one of the sets of DS units. Such obtaining of the reference entity's data access performance information includes at least one of outputting a data access performance information request message that identifies the reference entity, receiving the reference entity's data access performance information, and retrieving the reference entity's data access performance information from one of the plurality of DSNs or a publishing authority. For example, the processing module determines to read the error coded data file, identifies one or more of the plurality of DSNs that store a copy of the error coded data file and obtain these the reference entity's data access performance information for the one or more of the plurality of DSNs. As another example, the processing module determines to write the error coded data file and obtains the reference entity's data access performance information for each of the plurality of DSNs.

The method continues at step 226 where the processing module interprets the first and second data access performance information of at least one of the plurality of DSNs to identify a desired set of DS units within one of the plurality of DSNs. Such identification may be based on one or more of the data name, the user ID, metadata, the error coding dispersal storage parameters, the slice names, the data access performance information, access performance requirements, a comparison of data access performance information associated with a first set of DS units to data access performance information associated with a second set of DS units, and a comparison of data access performance information to the access performance requirements. For example, the processing module selects a fourth set of DS units as the desired set of DS units when a comparison of data access performance information associated with the fourth set of DS units compares favorably to the access performance requirements. As another example, the processing module selects a fifth set of DS units as the desired set of DS units when a comparison of data access performance information associated with the fifth set of DS units compares favorably to data access performance information associated with the fourth set of DS units. The method continues at step 228 where the processing module accesses the desired set of DS units regarding the error coded data file.

FIG. 12 is a flowchart illustrating an example of migrating data, which include similar steps to FIGS. 7 and 9. The method begins with step 234 where a processing module determines a previously stored data copy for migration. Such a determination may be based on one or more of which step a migration process left off last time, a data copy migration list, whether an amount of elapsed time since a last migration consideration has exceeded a time threshold, whether an elapsed time since an initial storage of the data copy has exceeded a time threshold, a requirements change indicator, a dispersed storage network (DSN) system status change indicator, a predetermination, a command, and a message. Such a data copy migration list may include one or more of a user identifier (ID), a data copy name, a data type indicator, a data object hash, a vault ID, a data size indicator, a priority indicator, a security indicator, storage requirements, an initial storage timestamp, a time stamp corresponding to the last migration consideration, a time threshold, and a performance indicator.

The method continues with steps 116-126 of FIG. 7 where the processing module determines metadata, determines the replication factor, determines a plurality of DSNs, determines DS unit storage sets, determines error coded dispersal storage parameters, and saves the error coding dispersal storage parameters utilizing current data copy storage requirements and a current status and performance level associated with the plurality of DSNs. The method continues with step 174 of FIG. 9 where the processing module retrieves encoded data slices of the data copy (e.g., to be migrated).

The method continues with step 130 of FIG. 7 where the processing module sends the data copy to the units of the DS unit storage sets for storage therein. For example, the processing module sends the data copy to DS unit storage sets, wherein the DS unit storage sets are substantially the same as previous DS unit storage sets utilized to previously store the data copy when one or more of the metadata, replication factor, the plurality of DSNs, the DS unit storage sets, and the error coding dispersal storage parameters are substantially the same as corresponding previous metadata, replication factor, plurality of DSNs, DS unit storage sets, and error coding dispersal storage parameters utilized to previously store the data copy. As another example, the processing module sends the data copy to three DS unit storage sets (e.g., a replication factor of 3) when the data copy was originally stored with replication factor of 2 and a higher level of reliability is currently required. As yet another example, the processing module sends the data copy to a single DS unit storage set when the data copy was initially stored with replication factor of 2 and a lower level of reliability is acceptable.

FIG. 13 is a flowchart illustrating an example of modifying the storage of data. The method begins with step 252 where a processing module determines access performance to copies of dispersed storage encoded data, wherein the copies of the dispersed storage encoded data are stored in a set of a plurality of dispersed storage networks (DSNs). Such determining of the access performance includes at least one of determining an access timing performance level, determining an availability performance level, and determining a reliability performance level. Such determining of the access timing performance level may be based on one or more of access timing performance historical data (e.g., average for a plurality of user devices, average the set of DSNs), a query, at least one ping test, at least one dispersed storage network test, and at least one encoded data slice access timing performance test. Such determining of the availability performance level may be based on one or more of availability performance historical data (e.g., DS unit availability, DSN availability, a number of DS units online, comparing the number of DS units online to one or more of a decode threshold, a write threshold, and a read threshold) and at least one encoded data slice availability test. Such determining of the reliability performance level may be based on one or more of reliability performance historical data (e.g., DS unit reliability, DSN reliability, a number of DS units online, comparing the number of DS units online to one or more of a decode threshold, a write threshold, and a read threshold) and at least one encoded data slice retrieval success test.

The method continues at step 254 where the processing module determines that the access performance is not at the desired access performance level by comparing actual global data retrieval access information with estimated global data retrieval accesses of the copies of the dispersed storage encoded data and indicating that the access performance is not at the desired access performance level when the actual global data retrieval access information compares unfavorably with the estimated global data retrieval accesses. Such estimated global data retrieval accesses may include a desired access performance level further including one or more of an access timing storage performance level goal, an availability storage performance level goal, and a reliability storage performance level goal.

The method continues at step 256 where the processing module modifies the set of the plurality of DSNs based on the access performance and the desired access performance level to produce a modified set of the plurality of DSNs when the access performance is not at a desired access performance level. Such modification of the set of the plurality of DSNs may include one or more of adding a new DSN, removing a current DSN, and reusing a current DSN. For example, the processing module determines differences between the actual global data retrieval access information and the estimated global data retrieval accesses of the copies of the dispersed storage encoded data and identifies the new DSN based on the differences. As another example, the processing module identifies a DSN of the set of DSNs to remove from the set of DSNs based on differences between the actual global data retrieval access information and the estimated global data retrieval accesses of the copies of the dispersed storage encoded data. As yet another example, the processing module identifies a remaining DSN of the set of DSNs to reuse based on reliability information of the access performance and desired reliability of the desired access performance level.

The method continues at step 258 where the processing module determines whether the new DSN is added. The method branches to step 264 when the processing module determines not to add the new DSN. The method continues to step 260 when the processing module determines to add the new DSN. The method continues at step 260 where the processing module determines error coding dispersal storage parameters based on local data retrieval accesses allocated to the new DSN for the new DSN of a modified set of the plurality of DSNs. The method continues at step 262 where the processing module facilitates the new DSN storing another copy of the dispersed storage encoded data. Such facilitation includes at least one of retrieving one of the copies from a remaining DSN of the set of DSNs, decoding the one of the copies based on error coding dispersal storage parameters of the remaining DSN to produce the data, encoding the data in accordance with the error coding dispersal storage parameters to produce the other copy, and outputting the other copy to the new DSN. Alternatively, the facilitation includes determining that a remaining DSN of the set of DSNs utilized the error coding dispersal storage parameters and coordinating forwarding the other copy from the remaining DSN to the new DSN. As yet another alternative, the facilitation includes outputting the other copy to at least two DSNs of the modified set of the plurality of DSNs, wherein the at least to DSNs includes the new DSN (e.g., a first portion of a set of encoded data slices to one DSN and a remaining portion of the set of encoded data slices to the second DSN).

The method continues at step 264 where the processing module determines whether to remove the DSN of the set of DSNs to remove. The method branches to step 266 when the processing module determines not to remove the DSN of the set of DSNs. The method continues to step 265 when the processing module determines to remove the DSN of the set of DSNs. The method continues at step 265 where the processing module removes the DSN from the set of DSNs. For example, the processing module removes the DSN from a list of DSNs then includes a copy of the copies of the dispersed storage encoded data. Alternatively, or in addition to, the processing module deletes a copy of the copies of the dispersed storage encoded data associated with the DSN of the set of DSNs.

The method continues at step 266 where the processing module determines whether to reuse the remaining DSN of the set of DSNs to reuse. The method branches to step 269 for the method ends when the processing module determines not to reuse the remaining DSN of the set of DSNs to reuse. The method continues to step 265 when the processing module determines to reuse the remaining DSN of the set of DSNs to reuse. The method continues at step 267 where the processing module determines new error coding dispersal storage parameters for a remaining DSN based on a difference between the reliability information of the access performance and the desired reliability of the desired access performance level.

The method continues at step 268 where the processing module facilitates the remaining DSN storing an updated copy of the dispersed storage encoded data based on the new error coding dispersal storage parameters. For example, the processing module retrieves a copy (e.g., a plurality of sets of encoded data slices) of the dispersed storage encoded data from the remaining DSN, dispersed storage error decodes the copy to reproduce the data, dispersed storage error encodes the data utilizing the new error coding dispersal storage parameters to produce the updated copy, and stores the updated copy in the remaining DSN. In an instance, the new error coding dispersal storage parameters includes a same decode threshold number as the error coding dispersal storage parameters and a larger width then a width of the error coding dispersal storage parameters. In such an instance, additional encoded parity slices are added to the remaining DSN (e.g., to improve retrieval reliability). Alternatively, or in addition to, the processing module outputs the updated copy to at least two DSNs of the set of DSNs to reuse, wherein the set of DSNs includes the remaining DSN (e.g., a first portion of a set of encoded data slices to one DSN and a remaining portion of the set of encoded data slices to the second DSN). The method continues to step 269 where the method ends.

FIG. 14 A is a flowchart illustrating an example of generating billing information. The method begins with step 270 where a processing module (e.g., of a dispersed storage (DS) managing unit) determines dispersed storage network DSN usage information. Such DSN usage information includes one or more of resource use, user activity by user identifier (ID), user activity by vault ID, resource use since a previous update, activity since a last update, amount of storage utilization, number of data segments stored, number of storage sequences, number retrieval sequence, and any other information that characterizes use inactivity within a corresponding DSN system. Such a determination may be based on one or more of monitoring usage, monitoring activity, historical activity records, historical usage records, a query, a vault lookup, a message, and a command. For example, the processing module determines that user 457 affiliated with DSN system 1 has used 1.496 terabytes of storage since a last update. As another example, the processing module determines that the vault A40 affiliated with DSN system 2 has performed 10,492 retrieval sequences since a last update.

The method continues with step 272 where the processing module determines whether to send the DSN usage information. Such a determination may be based on one or more of an elapsed time since a previous update was sent has exceeded a time threshold, a command, receiving a request to send the DSN usage information, a query, a predetermination, an error message, a new transaction indicator, and a DSN system status indicator. For example, the processing module determines to send the DSN usage information when 10 minutes has elapsed since a previous update was sent and the time threshold is 9 minutes. The method repeats back to step 270 when the processing module determines not to send DSN usage information. The method continues to step 274 when the processing module determines to send the DSN usage information.

The method continues at step 274 where the processing module sends the DSN usage information to one or more of a billing authority, a DS managing unit, a DS unit, a DS processing unit, and a storage integrity processing unit. For example, the processing module sends the DSN usage information to a billing authority that is operably coupled to two or more DSN systems to resolve billing information between the two or more DSN systems. For instance, the processing module sends billing amounts (e.g., monetary values) corresponding to the DSN usage information in accordance with a billing rate to the billing authority. Such a billing authority may balance credits and debits between two or more DSN systems as discussed in greater detail with reference to FIG. 14 B.

FIG. 14 B is a flowchart illustrating an example of aggregating dispersed storage network (DSN) usage information. The method begins with step 276 where a processing module (e.g., of a billing authority) receives DSN usage information from two or more DSNs. For example, the processing module receives DSN 1 usage information from a dispersed storage (DS) managing unit associated with DSN 1 and the processing module receives DSN 2 usage information from a DS managing unit associated with DSN 2.

The method continues at step 278 where the processing module determines whether to aggregate the DSN usage information. Such a determination may be based on one or more of an elapsed time since a previous aggregation has exceeded an aggregation time threshold, a command, a query, a predetermination, an error message, a new transaction indicator, and a DSN system status indicator. The method repeats back to step 276 when the processing module determines that to aggregate the DSN usage information. The method continues to step 280 when the processing module determines to aggregate the DSN usage information.

The method continues at step 280 where the processing module aggregates the DSN usage information. Such aggregation includes one or more of summarizing DSN resource usage by user identifier (ID) and/or vault ID, summarizing DSN activity by user ID and/or vault ID, summarizing DSN resource usage, summarizing DSN activity, converting usage information into billing information based on one or more billing rates, trading usage between different DSN systems, and trading credits and debits between different DSN systems. For example, the processing module evenly trade 10 units of DSN system 2 usage by user 123 of DSN system 1 for 10 units of DSN system 1 usage by user 456 of DSN system 2. As another example, the processing module creates a debit of two units for DSN system 1 when there are 8 units of DSN system 2 usage by user 123 of DSN system and there are 10 units of DSN system 1 usage by user 456 of DSN system 2. Such a unit of use may include an amount of storage per unit of time of one or more of data object storage, data segment storage, data slices of a pillar storage, and a data slice.

The method continues at step 282 where the processing module creates a billing report. Such a billing report indicates one or more of the DSN usage information, billing information, and a net credit and debit balance by DSN system ID, user ID and/or vault ID. The processing module may send the billing report to one or more DS managing units associated with one or more DSNs.

FIG. 15A is another flowchart illustrating another example of storing data, which include similar steps to FIG. 7. The method begins with steps 114, 116, and 118 of FIG. 7 where a processing module (e.g., associated with a dispersed storage network (DSN) that does not include a dispersed storage (DS) unit but rather interfaces to a plurality of DSN systems that each include at least one DS unit, for instance, an internet service provider portal) receives a store data request message, determines metadata, and determines a replication factor.

The method continues at step 290 where the processing module determines other DSN systems, wherein each DSN system of the other DSN systems includes at least one DS unit (e.g., where a data copy shall be stored). Such a determination may be based on one or more of attributes associated with a DSN portal, permissions associated with a user identifier (ID) associated with the store data request message, the replication factor, available DSN systems, DSN system attributes, data to be stored, storage requirements, the metadata, a message, and a lookup. For example, the processing module determines to store the data and a data copy of the data in DSN systems 3 and 8 when the processing module determines that DSN system attributes of DSN 3 and DSN 8 substantially match storage requirements (e.g., closer geographic proximity of DSN systems 3 and 8 to a user device associated with the data). Note that the processing module may determine to not utilize a local DSN system associated with the processing module when the processing module determines that the local DSN system attributes indicate that there are no DS units (e.g., the processing module is associated with portal with no associated storage).

The method continues with steps 124, 126, and 128 of FIG. 7 where the processing module determines error coding dispersal storage parameters, saves the error coding dispersal storage parameters, and encodes the data to produce a copy (e.g., at least a plurality of sets of encoded data slices). The method continues with the step where the processing module sends the plurality of sets of encoded data slices and the error coding dispersal storage parameters to the other DSNs for storage therein.

FIG. 15B is another flowchart illustrating another example of retrieving data, which include similar steps to FIGS. 7, 9, and 15A. The method begins with step 162 of FIG. 9 where a processing module (e.g., associated with a dispersed storage network (DSN) that does not include a dispersed storage (DS) unit but rather interfaces to a plurality of DSN systems that each include at least one DS unit, for instance, an internet service provider portal) receives a retrieve data request message from a requester (e.g., a user device). The method continues with steps 116, 122, and 124 of FIG. 7 where the processing module determines metadata, determines DS unit storage sets, and determines error coding dispersal storage parameters. The method continues with step 290 of FIG. 15A where the processing module determines other DSN systems. For example, the processing module determines DSN identifiers (IDs) of each DSN of the other DSN systems based on a file ID associated with the retrieved data request message and a file ID to DSN system table lookup.

The method continues at step 310 where the processing module selects DS units of the other DSNs to produce selected DS units. Such a selection may be based on one or more of the metadata, retrieval performance requirements, a DSN performance indicator, a DSN query, a replication factor, the DS unit storage sets the error coding dispersal storage parameters, the other DSN systems, DS unit attributes, DS unit availability information, DS unit reliability information, DS unit access cost, and DS unit performance information. For example, the processing module selects DS units of the other DSN systems that are closest to the processing module based on DS unit attributes and a query. The method continues with steps 174, 176, and 178 of FIG. 9 where the processing module retrieves at least a decode threshold number of encoded data slices of each of a plurality of sets of encoded data slices corresponding to the data from the selected DS units, dispersed storage error decodes the at least the decode threshold number of encoded data slices of each of the plurality of sets encoded data slices to the produce data in accordance with the error coding dispersal storage parameters, and sends the data object to the requester.

FIG. 16A is a flowchart illustrating an example of assigning a new vault. Such a new vault may be associated with one or more dispersed storage networks (DSNs). The method begins with step 318 where a processing module (e.g., of a dispersed storage (DS) managing unit) receives a new vault assignment request from one of a user device, another DS managing unit, and another DSN system. Such a new vault assignment request may include one or more of a user identifier (ID), a user device ID, a vault ID, a group ID, and a naming domain. Such a naming domain refers to utilization of the new vault including global, regional, sub-regional, local, and sub-local.

The method continues at step 319 where the processing module determines a naming domain based on one or more of information interpreted from the new vault assignment request, a user ID, a naming domain table lookup, a vault lookup, a vault list, a message, and a command. The method ends with step 320 where the processing module assigns local namespace to a new vault when the processing module determines that the naming domain is local. Such local namespace may include a range of source names and/or slice name addresses that are uniquely utilized in one or more DSNs. Such similar namespace may be assigned for use in two or more DSNs enabling use of the namespace range localized within each of the two or more DSNs. The method branches to step 321 when the processing module determines that the naming domain is not local (e.g., global, regional, sub-regional).

The method continues at step 321 where the processing module forwards the new vault assignment request to a naming authority. The method continues at step 322 where the processing module receives non-local new vault assignment information (e.g., from the naming authority in response to forwarding the new vault request). Such non-local new vault assignment information may include one or more of vault ID information, user ID information, source name range information, and slice name range information. The method continues at step 323 where the processing module stores the new vault assignment information for subsequent utilization by a DSN operationally affiliated with the processing module (e.g., a DS managing unit affiliated with the DSN).

FIG. 16B is another flowchart illustrating another example of assigning a new vault, which include similar steps to FIG. 16A. The method begins with steps 318 and of FIG. 16A where a processing module (e.g., of a naming authority) receives a new vault assignment request and determines a naming domain. For example, the processing module determines that the naming domain is global when the new vault assignment request includes a request for a global naming domain.

The method continues at step 326 where the processing module assigns namespace to a new vault. Note that the namespace may include a range of source name and/or slice name addresses that are utilized across two or more dispersed storage networks (DSNs). For example, the processing module assigns namespace that is shared amongst two or more DSNs when the naming domain is global. Note that such namespace assignment may further include assignment of one or more new user IDs and/or one or more new vault IDs. The method continues with step 323 of FIG. 16A where the processing module stores new vault assignment information to enable subsequent operation of two or more DSNs. The method continues at step 328 where the processing module sends the non-local new vault assignment information to DS managing unit(s) of affected DSNs.

FIG. 16C is a flowchart illustrating an example of accessing a dispersed storage network. A method begins with step 329 where a processing module receives a dispersed storage network (DSN) access request. Such an access request may include one or more of a user identifier (ID), a user device ID, a vault ID, a DSN ID, a source name, a file name, a file ID, a data type indicator, a priority indicator, a performance indicator, a security indicator, and a reliability indicator.

The method continues at step 330 where the processing module determines whether the DSN access request is associated with a local DSN vault or a global DSN vault, wherein the local DSN vault is contained within a DSN of a plurality of DSNs (e.g., local DSN vault includes a namespace address range utilized within at least one DSN and potentially reused within at least one other DSN) and the global DSN vault is contained within at least some of the plurality of DSNs (e.g., global DSN vault includes a namespace address range utilized across two or more DSNs). Such determining includes at least one of interpreting a requester identifier of the DSN access request, interpreting a vault identifier of the DSN access request, interpreting a data type of the DSN access request, accessing a table look-up, interpreting a local or global DSN identifier within the DSN access request (e.g., a flag), and querying a naming authority. For example, the processing module determines that the DSN access request is associated with the global DSN vault when the vault ID of the DSN access request is associated with the global DSN vault. As another example, the processing module determines that the DSN access request is associated with the global DSN vault based on a query response from the naming authority.

The method branches to step 331 when the processing module determines that the DSN access request is associated with the local DSN vault. The method continues to step 331 when the processing module determines that the DSN access request is associated with the global DSN vault. The method continues at step 331 where the processing module determines whether the DSN access request includes a vault assignment request when the processing module determines that the DSN access request is associated with the global DSN vault. Such a vault assignment request includes at least one of a user ID, a user device ID, a group ID, and a requested naming domain (e.g., global, local, regional, sub-regional, sub-local). Such a determination may be based on one or more of interpreting the vault assignment request from the DSN access request, determining that the DSN access request is associated with a vault identifier that has not been assigned, a message, and an error indicator.

The method continues at step 332 where the processing module sends the vault assignment request to a naming authority. The method continues at step 333 where the processing module receives a global vault assignment response that identifies a primary DSN (e.g., associated with the global DSN vault). The method continues at step 334 where the processing module processes vault assignment information from a global vault assignment response by one or more of extracting the vault assignment information from the global vault assignment response, storing the vault assignment information, and sending the vault assignment information to a sender of the DSN access request.

The method continues at step 335 where the processing module identifies a primary DSN of the plurality of DSNs. Such identifying includes at least one of interpreting a requester identifier of the DSN access request, interpreting a global vault identifier of the DSN access request, interpreting a data type of the DSN access request, accessing a table look-up, interpreting a global DSN identifier within the DSN access request, and querying a naming authority. The method continues at step 336 where the processing module facilitates processing of the DSN access request by the primary DSN. Such facilitating includes identifying, by a first DSN of the plurality of DSNs, the first DSN as the primary DSN, processing, by the first DSN, the DSN access request to produce a DSN access response, and sending the DSN access response to a sender of the DSN access request. Alternatively, the facilitating includes identifying, by a first DSN of the plurality of DSNs, a second DSN of the plurality of DSNs as the primary DSN and forwarding the DSN access request to the second DSN.

The method continues at step 331 where the processing module determines whether the DSN access request includes the vault assignment request when the DSN access request is associated with the local DSN vault. The method branches to step 338 when the processing module determines that the DSN access request does not include the vault assignment request. The method continues to step 337 when the processing module determines that the DSN access request includes the vault assignment request. The method continues at step 337 where the processing module creates the local vault (e.g., assigns a new local vault identifier to a user of the request, wherein the new local vault identifier may be reused in one or more other DSNs). The method continues at step 338 where the processing module processes the DSN access request to produce a DSN access response when the DSN access request does not include the vault assignment request. For example, the processing module facilitates storing an encoded data slice in the local DSN vault and generates a write response message as the DSN access response when the DSN access request includes a write request. As another example, the processing module facilitates retrieving an encoded data slice from the local DSN vault and generates a read response message that includes the encoded data slice as the DSN access response when the DSN access request includes a read request. The method continues at step 339 where the processing module sends the DSN access response to a sender of the DSN access request.

FIG. 17A is a flowchart illustrating an example of acquiring security information. The method begins with step 340 where a processing module (e.g., of a dispersed storage (DS) managing unit) outputs a dispersed storage network (DSN) registration request message to a security authority. For example, the processing module determines to send the DSN registration request message based on at least one of when an affiliated DS managing unit is brought online, when the DS managing unit reboots, and when a previous signed certificate expires. Such a DS managing unit may serve as a local DSN certificate authority (CA) with respect to elements (e.g., a user device, a DS processing unit, other DS managing units, a storage integrity processing unit, and a DS unit) of a local DSN and may serve as an intermediate CA with respect to a root CA (e.g., a security authority), wherein the root CA is associated with a plurality of DSNs that includes the local DSN. Such a DSN registration request message may include one or more of a DSN identifier (ID), a DS managing unit ID, an affiliated user device ID, DSN storage capacity parameters, DSN system status, DSN storage availability parameters, DSN controlling authority contact information, and any other information to facilitate utilization of DSN system resources. Such outputting of the DSN registration request message includes sending the DSN registration request message to one or more of a security authority, a management authority, a naming authority, a billing authority, and the publishing authority. For example, the processing module sends the DSN registration request message to the security authority when the processing module determines that local DSN has been initialized but has not registered with the security authority.

The method continues at step 342 where the processing module receives a DSN registration response message. Such a DSN registration response message includes a local DSN certificate authority universal unique identifier (UUID). Such a UUID uniquely identifies each system element and in an instance is 16 bytes in length. The method continues at step 344 where the processing module generates and saves a DSN CA public key and a paired local DSN CA private key such that information encrypted with the private key may be decrypted with the public key and information encrypted with the public key may be decrypted with the private key. For example, only the processing module utilizes the private key to encrypt or decrypt messages when the processing module functions as the local DSN CA and any other system element utilizes the public key to encrypt or decrypt messages to and from the local DSN CA.

The method continues at step 346 where the processing module generates a local DSN CA certificate signing request (CSR). Such a request may include one or more of the local DSN CA UUID, the local DSN CA public key, and a local DSN CA signature. Such a local DSN CA signature may be generated by encrypting a hash digest of the request content utilizing the local DSN CA private key. The method continues at step 348 where the processing module sends the local DSN CA CSR to the security authority.

The method continues at step 350 where the processing module receives a local DSN CA signed certificate signed by security authority (e.g., a root CA) from the security authority. The processing module may validate the signed certificate by comparing a decrypted signature of the signed certificate, utilizing a root CA public key included in the certificate, to a hash digest of the content of the certificate. Next, the processing module determines that the certificate is valid when the comparison is favorable (e.g., the same). Next, the processing module saves the root CA signed local DSN CA certificate when the processing module determines that the certificate is valid.

The local DSN DS managing unit may serve as an intermediary for the overall root CA of the security authority such that the managing unit may register and issue signed certificates to elements of the local DSN operating within the local DSN and requesting access to system elements within another DSN of the plurality of DSNs.

FIG. 17 B is a flowchart illustrating an example of assigning security information. The method begins with step 352 where a processing module (e.g., of a security authority) receives a dispersed storage network (DSN) registration request from a DSN (e.g., from a dispersed storage (DS) managing unit acting as a certificate authority of the DSN). Such a security authority may be associated with a plurality of DSNs and may serve as at least one of a root certificate authority (CA) and a registration authority with respect to the DSN of the plurality of DSNs. Next, the processing module validates the DSN registration request by comparing DSN information of the DSN registration request to saved DSN information from a previous registration process to authenticate the DSN registration request. For example, the processing module determines that the comparison is favorable when identity information contained in the DSN information is substantially the same as identity information in the saved DSN information.

The method continues at step 354 where the processing module generates a local DSN CA universal unique identifier (UUID) and generates billing information when the processing module determines that the DSN registration request message is valid. Such billing information may include one or more of the local DSN CA UUID, the DSN information, DSN contact information, DSN user device information, and billing rates. The processing module may send the billing information to one or more of a management authority, a naming authority, a billing authority, and a publishing authority. The method continues at step 356 where the processing module sends a registration response to the local DSN CA that includes the DSN CA UUID and an authorization code.

The method continues with step 358 where the processing module receives a DSN certificate signing request (CSR) from the local DSN CA. The method continues at step 360 where the processing module validates the CSR. Such validating includes comparing a hash digest of the CSR content to a decrypted local DSN CA signature utilizing the local DSN CA public key. The processing module validates the CSR when the comparison is favorable (e.g., substantially the same). Next, the processing module saves the local DSN CA public key received in the CSR.

The method continues at step 362 where the processing module generates a signed local DSN CA certificate signed by the security authority when the processing module validates the CSR. Such a root CA signed local DSN CA certificate may include one or more of the local DSN CA certificate signing request, a root CA UUID, a root CA public key, and a root CA signature. Such a root CA signature may be generated by encrypting a hash digest of the certificate content utilizing a root CA private key. The method continues at step 364 where the processing module sends the root CA signed local DSN CA certificate to the local DSN CA. Such a method verifies that the local DSN CA can issue signed certificates to DSN elements on behalf of the root CA such that the DSN elements may subsequently access DSN elements of the plurality of DSNs.

FIG. 18 A is a flowchart illustrating another example of acquiring security information. The method begins with step 368 where a processing module (e.g., of a user device) outputs a registration request message that includes requesting access to a local dispersed storage network (DSN) and requesting access to a global DSN, wherein the global DSN includes a plurality of DSNs and the local DSN is one of the plurality of DSNs. Such a registration request message includes at least one of a requester identifier (ID), a DSN ID, a dispersed storage (DS) managing unit ID, a DS processing unit ID, a user device ID, a DSN storage capacity indicator, a DSN status indicator, a DSN storage availability indicator, and authority contact information. Such outputting of the registration request message includes sending the registration request message to at least one of a local DSN registration authority, a global DSN registration authority, a certificate authority (CA), a security authority, a management authority, a naming authority, a billing authority, and a publishing authority.

The method continues at step 370 where the processing module receives a registration response message that includes a global universal unique identifier (UUID) and a local UUID. The method continues at step 372 where the processing module generates a global public-private key pair and a local public-private key pair. For example, the processing module generates the global public-private key pair and generates the local public-private key pair such that the local public-private key pair is substantially the same as the global public-private key pair. Next, the processing module saves the global public-private key pair and the local public-private key pair.

The method continues at step 374 where the processing module generates a global certificate signing request (CSR) based on the global UUID and a private key of the global public-private key pair. Such a global CSR includes at least one of a global authorization code, the global UUID, a global public key of the global public-private key pair, and a global signature, wherein the global signature includes an encrypted hash of the global CSR utilizing a private key of the global public-private key pair. At step 374, the processing module generates a local CSR based on the local UUID and a private key of the local public-private key pair. Such a local CSR includes at least one of a local authorization code, the local UUID, a local public key of the local public-private key pair, and a local signature, wherein the local signature includes an encrypted hash of the local CSR utilizing a private key of the local public-private key pair.

The method continues at step 376 where the processing module sends the global and local CSRs to a certificate authority (CA) (e.g., a security authority associated with the plurality of DSNs). Alternatively, the processing module sends the global CSR to a global CA and the local CSR to a local CA. The method continues at step 378 where the processing module receives a signed global certificate and a signed local certificate. Next, the processing module saves the signed global certificate and the signed local certificate and to utilize the certificates in subsequent DSN access requests.

FIG. 18 B is a flowchart illustrating another example of assigning security information. The method begins with step 380 where a processing module receives a registration request from a valid requesting entity (e.g., the processing module may validate the requesting entity by favorably comparing a requester identifier (ID) with a stored requester ID from a previous registration process). The method continues at step 382 where the processing module determines whether the registration request includes requesting registration to a global dispersed storage network (DSN) that includes a plurality of DSNs. Such a determination may be based on one or more of the requester ID, a received DSN ID, a table lookup, and a message. At step 382, the processing module determines whether the valid requesting entity has a local universally unique identifier (UUID) of a home DSN of the plurality of DSNs when the registration request is requesting registration to the global DSN. Such a determination may be based on one or more of a list of UUIDs associated with the home DSN, a lookup, and a message. Next, the processing module generates a global UUID when the registration request includes requesting registration to the global DSN and when the valid requesting entity has the local UUID. The processing module generates the local UUID and the global UUID when the valid requesting entity does not have the local UUID when the registration request includes requesting registration to the global DSN. In addition, the processing module may facilitate initialization of billing information for the valid requesting entity when the valid requesting entity does not have the local UUID.

The method continues at step 384 where the processing module sends, to the valid requesting entity, a registration response that includes one or more of the local UUID (e.g., newly generated or retrieved from a previous generation sequence) and a local authorization code that is associated with the local UUID, and the global UUID and a global authorization code that is associated with the global UUID. The method continues at step 386 where the processing module receives a global certificate signing request (CSR) from the valid requesting entity. The method continues at step 388 where the processing module validates the global CSR by at least one of a favorable comparison of a received authorization code of the global CSR with a stored authorization code associated with the global UUID and a favorable comparison of a hash of the global CSR with a decrypted signature of the global CSR utilizing a public key of the global CSR.

The method continues at step 390 where the processing module generates a global signed certificate when the global CSR is valid. Such a global signed certificate includes at least one of the global CSR, a global certificate authority (CA) UUID, a CA signature, and a CA public key of a public-private key pair. The processing module may generate the CA signature by at least one of hashing the global signed certificate, encrypting the global signed certificate utilizing a CA private key of the public-private key pair, hashing and encrypting the global signed certificate utilizing the CA private key of the public-private key pair, and retrieving the CA signature from another CA (e.g., from a security authority CA). The method continues at step 392 where the processing module sends the global signed certificate to the valid requesting entity. Alternatively, the processing module receives a local CSR from the valid requesting entity, generates a local signed certificate, sends the local signed certificate to the valid requesting entity when the local CSR is valid and when the valid requesting entity does not have the local UUID. Such a method enables the processing module (e.g., of the user device) to subsequently access different DSN elements of the plurality of DSNs by presenting the signed certificate. Such a method to access different DSN elements is discussed in greater detail with reference to FIGS. 19 A and 19 B.

FIG. 19 A is a flowchart illustrating an example of requesting access to a dispersed storage network (DSN). The method begins with step 396 where a processing module (e.g., of a user device) receives a data access request. Such an access may include one or more of a write request, a read request, a delete request, a list request, etc. Such data may be stored as one or more copies in one or more DSNs. The method continues at step 398 where the processing module determines whether the data access request is requesting access to data stored in a plurality of DSNs (e.g., in just one or two or more DSNs). Such determining includes one or more of determining whether access to the plurality of DSNs is established, establishing access to the plurality of DSNs (e.g., registering and obtaining signed certificates) when the access to the plurality of DSNs is not established, and accessing a DSN lookup table based on the data access request when the access to the plurality of DSNs is established. For example, the processing module accesses the DSN lookup table to retrieve the plurality of DSNs when the data access request is a read request. As another example, the processing module accesses the DSN lookup table to determine (e.g., based on storage requirements and DSN attributes) the plurality of DSNs when the data access request is a write request.

The method branches to step 408 when the processing module determines that the data access request is not requesting access to data stored in the plurality of DSNs (e.g., the request is to access data in just one DSN). The method continues to step 400 when the processing module determines that the data access request is requesting access to data stored in the plurality of DSNs.

The method continues at step 400 where the processing module determines whether one of the plurality of DSNs is a home DSN to a requesting entity. Such a determination may be based on one or more of a user identifier (ID), DSN IDs associated with the plurality of DSNs, a user ID affiliation to DSN ID table lookup, a DSN ID from the data access request, and a message. For example, the processing module determines that one of the plurality of DSNs is the home DSN when the plurality of DSNs includes DSN 3, DSN 5, and DSN 7 and a DSN ID table lookup indicates that DSN 5 is a home DSN for the requesting entity (e.g., of an associated user device). The method branches to step 404 when the processing module determines that one of the plurality of DSNs is not the home DSN to the requesting entity. The method continues to step 402 when the processing module determines that one of the plurality of DSNs is the home DSN to the requesting entity. The method continues at step 402 where the processing module utilizes a local signed certificate to access one or more dispersed storage (DS) units of the home DSN when the plurality of DSNs includes the home DSN.

The method continues at step 404 where the processing module validates a global signed certificate with one or more DS units of a non-home DSN of the plurality of DSNs to produce a valid global signed certificate. Such validating of the global signed certificate with the one or more DS units of the non-home DSN includes at least one of validating the global signed certificate with each of the one or more DS units of the non-home DSN of the plurality of DSNs to produce a set of valid global signed certificates and validating the global signed certificate with a proxy unit (e.g., a DS unit or other unit within the plurality of DSNs) of the one or more DS units of the non-home DSN of the plurality of DSNs to produce the valid global signed certificate. Alternatively, such validating of the global signed certificate with the one or more DS units of the non-home DSN includes obtaining the global signed certificate from a local memory or from a certificate authority, sending the global signed certificate to the one or more DS units of the non-home DSN and receiving a challenge message from the one or more DS units of the non-home DSN, generating a challenge response message in accordance with the challenge message and based on the global signed certificate, sending the challenge response message to the one or more DS units of the non-home DSN, and receiving validation (e.g., a validation message and/or an access response) from the one or more DS units of the non-home DSN. The method continues at step 406 where the processing module utilizes the valid signed certificate to access the one or more DS units of the non-home DSN.

The method continues at step 408 where the processing module determines whether the one of the plurality of DSNs is the home DSN or the non-home DSN when the data access request is requesting access to data stored in one of the plurality of DSNs. The method branches to step 410 when the processing module determines that the one DSN is the home DSN. The method continues to step 402 when the processing module determines that the one DSN is the non-home DSN. The method continues at step 402 where the processing module accesses one or more DS units of the home DSN utilizing the local signed certificate.

The method continues at step 410 where the processing module validates a global signed certificate with a set of DS units of a non-home DSN of the plurality of DSNs to produce the valid global signed certificate when the one of the plurality of DSNs is the non-home DSN. The method continues at step 412 where the processing module utilizes the valid global signed certificate to access the set of DS units of the non-home DSN.

FIG. 19 B is a flowchart illustrating an example of processing a dispersed storage network (DSN) access request. The method begins with step 414 where a processing module (e.g., of a dispersed storage (DS) unit) receives, from a requesting entity (e.g., a user device), an access request that includes a signed certificate. The method continues at step 416 with the processing module determines whether the requesting entity is affiliated with a home dispersed storage network (DSN) (e.g., a DSN receiving the access request). Such a determination may be based on one or more of a requesting entity identifier (ID), a received home DSN ID, a predetermined home DSN ID, a requesting entity ID to home DSN ID table lookup, a query, and a message. For example, the processing module determines that the requesting entity is affiliated with the home DSN when a requesting entity ID to home DSN ID table lookup based in the case that the home DSN ID is 5 and the predetermined home DSN ID is 5 (e.g., a DSN associated with the processing module).

The method branches to step 418 when the processing module determines that the requesting entity is not affiliated with the home DSN. The method continues to step 417 when the processing module determines that the requesting entity is affiliated with the home DSN. The method continues at step 417 where the processing module processes the access request as a local DSN access request. For example, the processing module authenticates the signed certificate as a local DSN signed certificate and executes the access request when the signed certificate is favorably authenticated.

The method continues at step 418 where the processing module validates the signed certificate when the requesting entity is not affiliated with the home DSN, wherein such validation includes authenticating the signed certificate in accordance with an authenticating function. Such an authenticating function includes determining whether the signed certificate is authentic based on at least one of sending the signed certificate to an authenticating authority entity (e.g., to a security authority) and determining that a hash of at least a portion (e.g., a certificate) of the signed certificate compares favorably to a decrypted corresponding portion (e.g., a signature) of the signed certificate utilizing a public key associated with the requesting entity. The method branches to step 422 when the processing module determines that the signed certificate is authentic. The method continues to step 420 when the processing module determines that the signed certificate is not authentic. The method continues at step 420 where the processing module rejects the access request. Such rejecting includes one or more of sending a reject message to the requesting entity and sending an error message to a dispersed storage managing unit.

The method continues at step 422 where the processing module continues to validate the signed certificate including generating a challenge message based on the access request when the signed certificate is authenticated. Such generating of the challenge message includes at least one of generating a message to include a secret (e.g., a random number, a predetermined character, a predetermined number), generating a challenge instruction that includes an instruction to return a signature of the message using a private key associated with the requesting entity, encrypting the secret utilizing a public key associated with the requesting entity to produce an encrypted secret for inclusion in the message, and generating the challenge instruction to include an instruction to return a decrypted secret using the private key.

The method continues at step 424 with a processing module outputs the challenge message to the requesting entity. The method continues at step 426 where the processing module receives a challenge response message from the requesting entity and determines whether the challenge response message compares favorably to an expected response. Such determining whether the challenge response message compares favorably to the expected response includes at least one of determining that the signature of the message using the private key is valid based on the public key (e.g., a hash of the message is substantially the same as a decrypted signature utilizing the public key of the requesting entity) and determining that the decrypted secret compares favorably to the secret. The method continues at step 428 where the processing module executes the access request when the challenge response message compares favorably to the expected response.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method comprises:
for each of a plurality of dispersed storage networks (DSNs) in a computing system network, identifying sets of dispersed storage (DS) units, wherein a set of the sets of DS unit stores an error coded data file;
identifying a reference entity within the computing system network;
for each of the plurality of DSNs:
   determining first data access performance information between the reference entity and a first one of the sets of DS units; and
   determining second data access performance information between the reference entity and a second one of the sets of DS units, wherein determining each of the first and second data access performance information includes:
      determining a likelihood of retrieving a decode threshold number of encoded data slices of at least a portion of the error coded data file;
      determining data retrieval access latency for retrieving the decode threshold number of encoded data slices; and
      generating the data access performance information based on the likelihood of retrieving the decode threshold number of encoded data slices and the data retrieval access latency; and storing the first and second data access performance information for each of the plurality of DSNs to produce system data access performance information.

2. The method of claim 1 further comprises:
identifying a second reference entity within the computing system network;
for each of the plurality of DSNs:
determining third data access performance information between the second reference entity and the first one of the sets of DS units; and
determining fourth data access performance information between the second reference entity and the second one of the sets of DS units; and
storing the third and fourth data access performance information for each of the plurality of DSNs as part of the system data access performance information.

3. The method of claim 1, wherein determining the data access performance information comprises:
determining a likelihood of storing a write threshold number of encoded data slices of the at least a portion of the error coded data file;
determining data write access latency for storing the write threshold number of encoded data slices; and
generating the data access performance information based on the likelihood of storing the write threshold number of encoded data slices and the data write access latency.

4. The method of claim 1 further comprises:
updating previous data access performance information with current data access performance information to produce the data access performance information.

5. The method of claim 1 further comprises:
outputting the data access performance information to an accessing device such that the accessing device determines specific data access performance information based on the reference entity's data access performance information.

6. A computer comprises:
an interface;
a memory; and
a processing module operable to:
for each of a plurality of dispersed storage networks (DSNs) in a computing system network, identify sets of dispersed storage (DS) units, wherein a set of the sets of DS unit stores an error coded data file;
identify a reference entity within the computing system network;
for each of the plurality of DSNs:
determine first data access performance information between the reference entity and a first one of the sets of DS units; and
determine second data access performance information between the reference entity and a second one of the sets of DS units, wherein the processing module further functions to determine each of the first and second data access performance information by:
determining a likelihood of retrieving a decode threshold number of encoded data slices of at least a portion of the error coded data file;
determining data retrieval access latency for retrieving the decode threshold number of encoded data slices; and
generating the data access performance information based on the likelihood of retrieving the decode threshold number of encoded data slices and the data retrieval access latency; and
store, in the memory, the first and second data access performance information for each of the plurality of DSNs to produce system data access performance information.

7. The computer of claim 6, wherein the processing module further functions to:
identify a second reference entity within the computing system network;
for each of the plurality of DSNs:
determine third data access performance information between the second reference entity and the first one of the sets of DS units; and
determine fourth data access performance information between the second reference entity and the second one of the sets of DS units; and
store, in the memory, the third and fourth data access performance information for each of the plurality of DSNs as part of the system data access performance information.

8. The computer of claim 6, wherein the processing module further functions to determine the data access performance information by:
determining a likelihood of storing a write threshold number of encoded data slices of the at least a portion of the error coded data file;
determining data write access latency for storing the write threshold number of encoded data slices; and
generating the data access performance information based on the likelihood of storing the write threshold number of encoded data slices and the data write access latency.

9. The computer of claim 6, wherein the processing module further functions to:
update, in the memory, previous data access performance information with current data access performance information to produce the data access performance information.

10. The computer of claim 6, wherein the processing module further functions to:
output, via the interface, the data access performance information to an accessing device such that the accessing device determines specific data access performance information based on the reference entity's data access performance information.

* * * * *